Feb. 18, 1941.  T. FJELLSTEDT  2,231,992
MEANS FOR CONTROLLING CURRENT
Filed Nov. 18, 1938  11 Sheets-Sheet 2
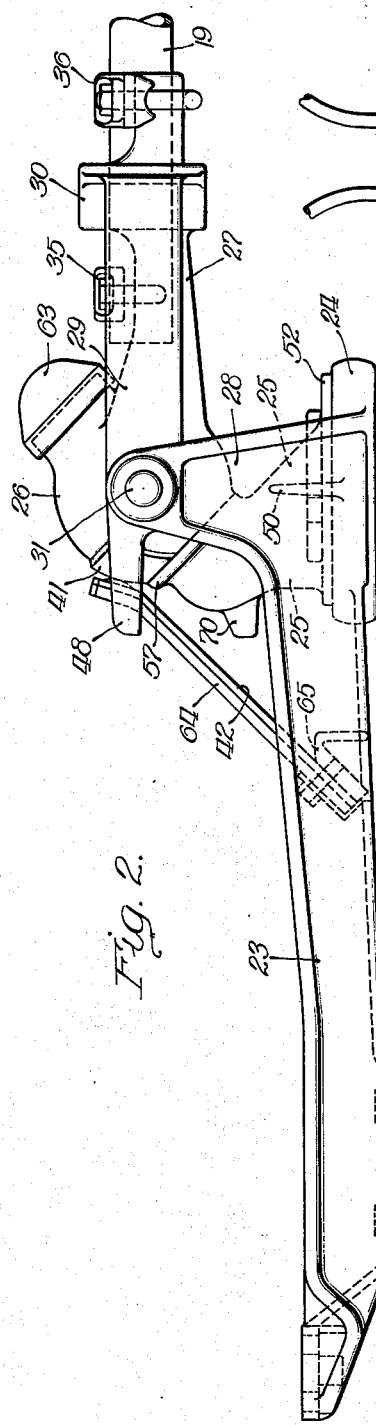
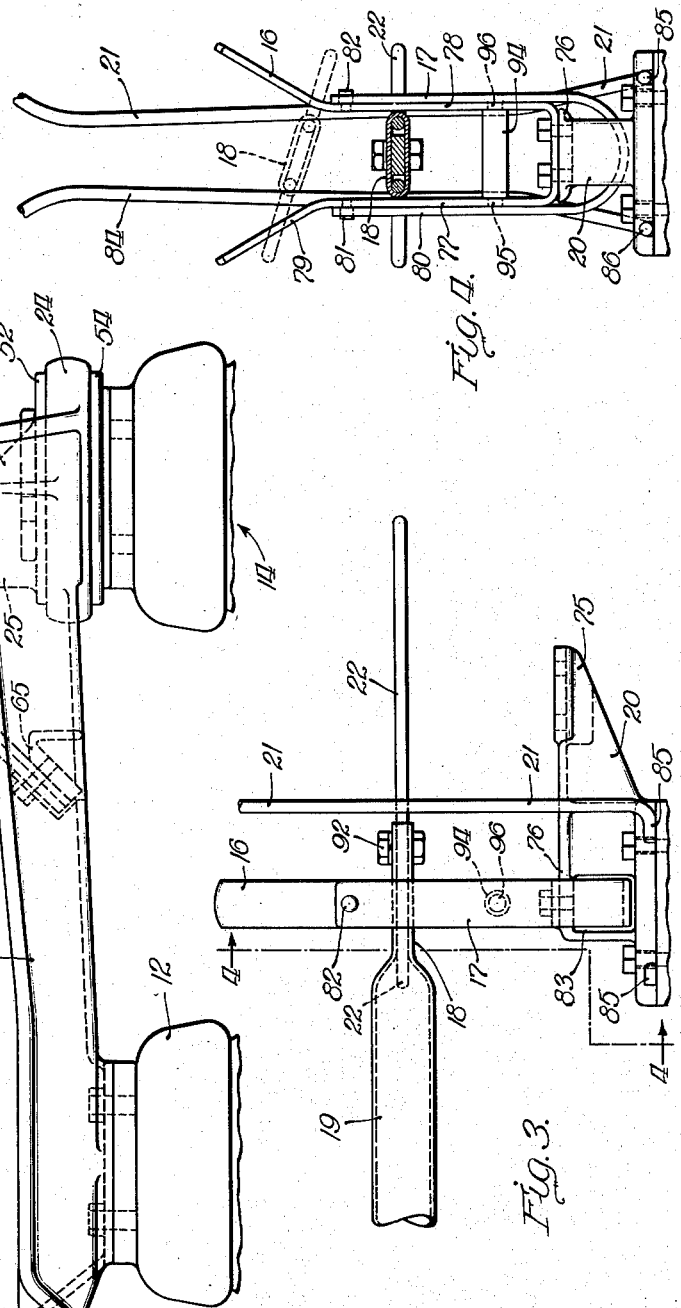
INVENTOR.
Thorsten Fjellstedt
BY Richardson and Guer
ATTORNEYS.

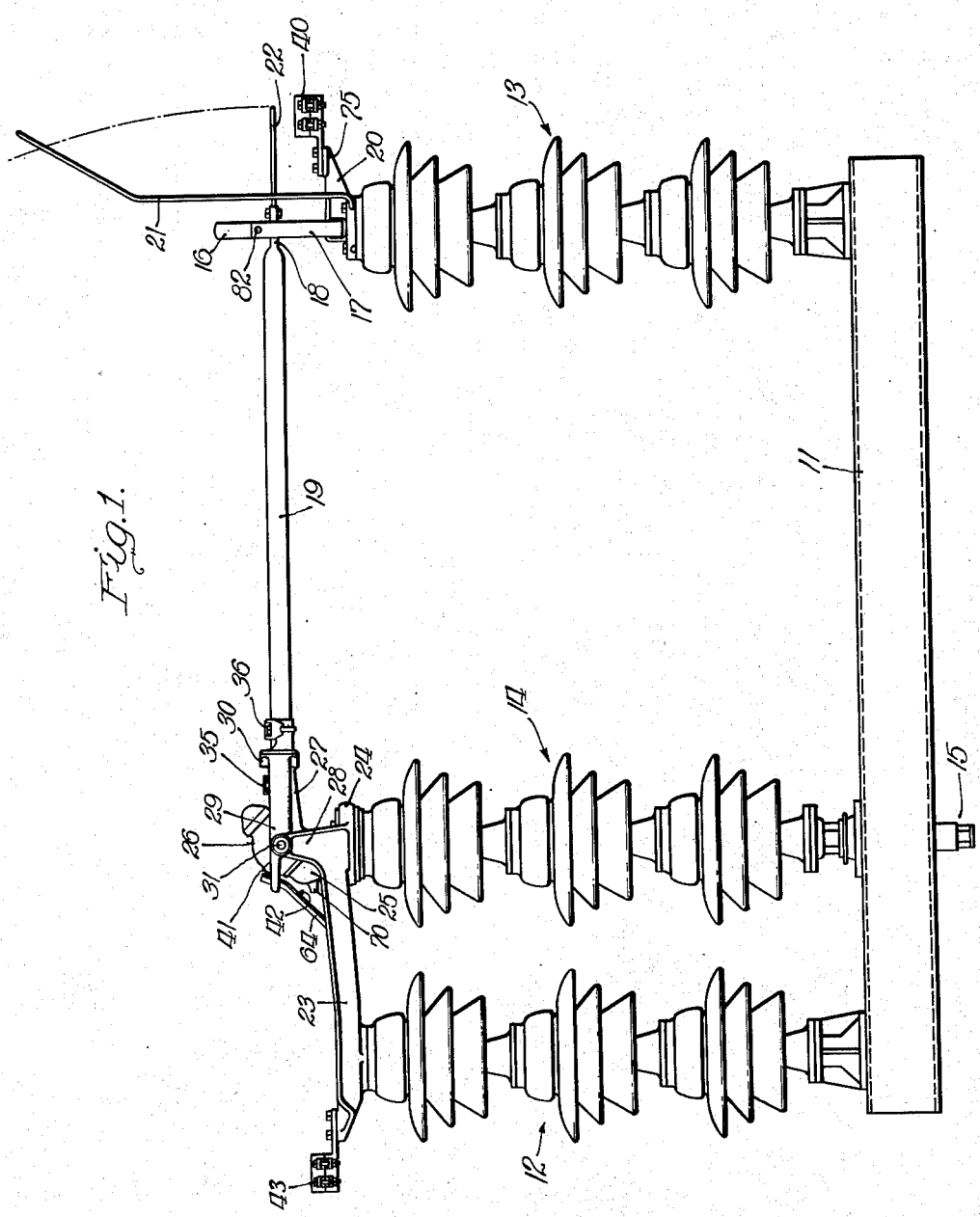

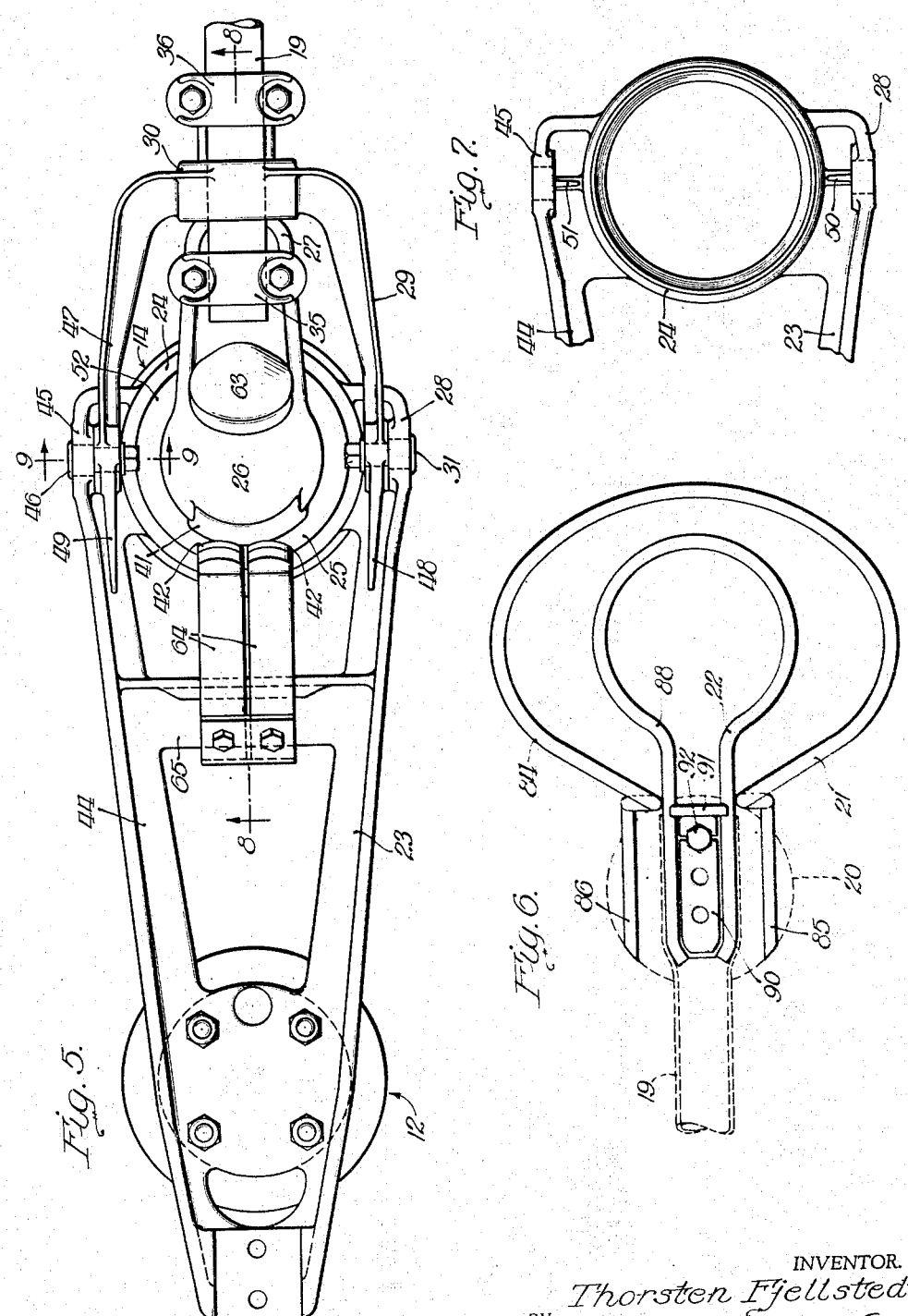

Feb. 18, 1941.  T. FJELLSTEDT  2,231,992
MEANS FOR CONTROLLING CURRENT
Filed Nov. 18, 1938  11 Sheets-Sheet 4
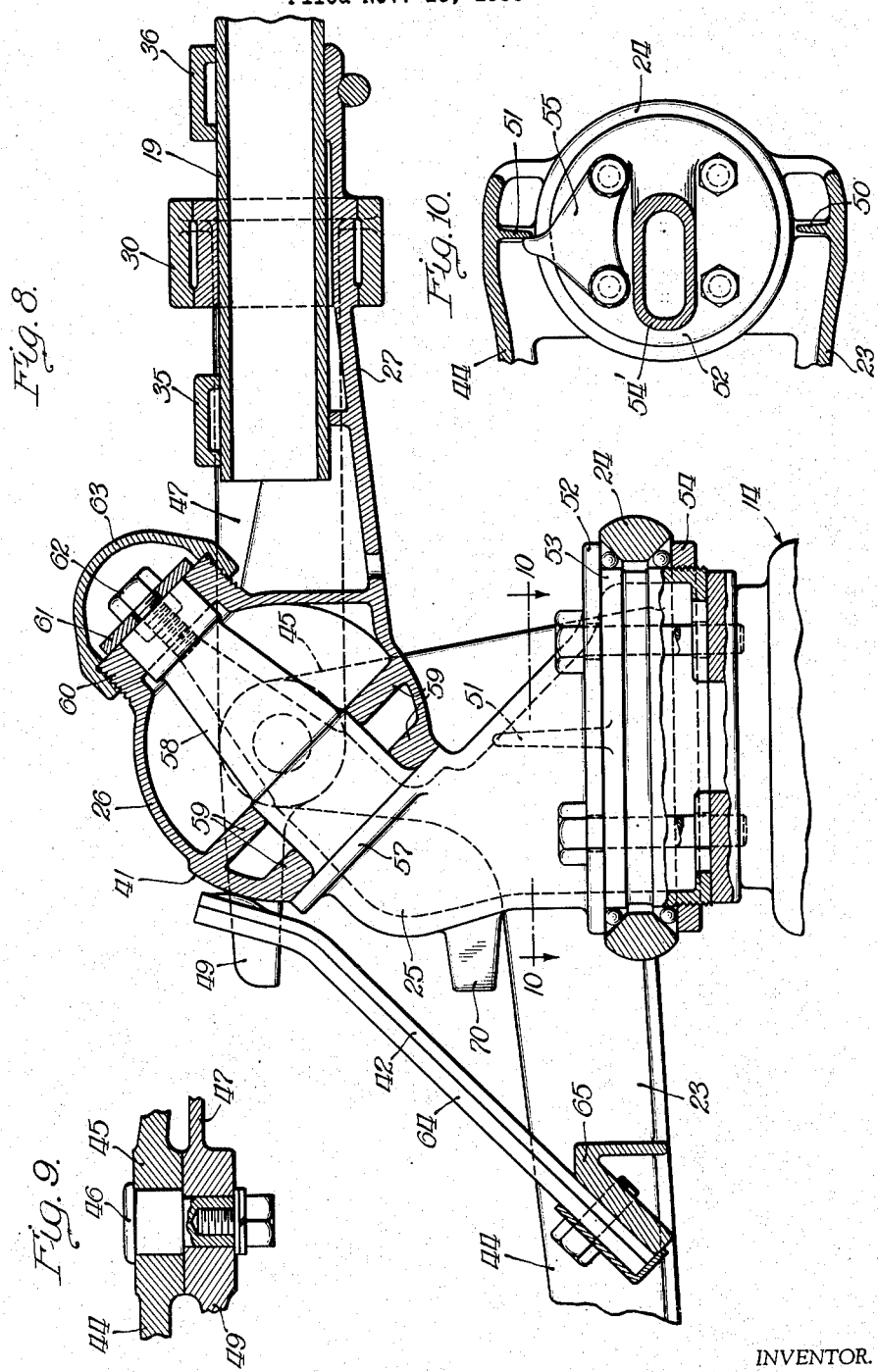
INVENTOR.
Thorsten Fjellstedt
BY Richardson
ATTORNEYS.

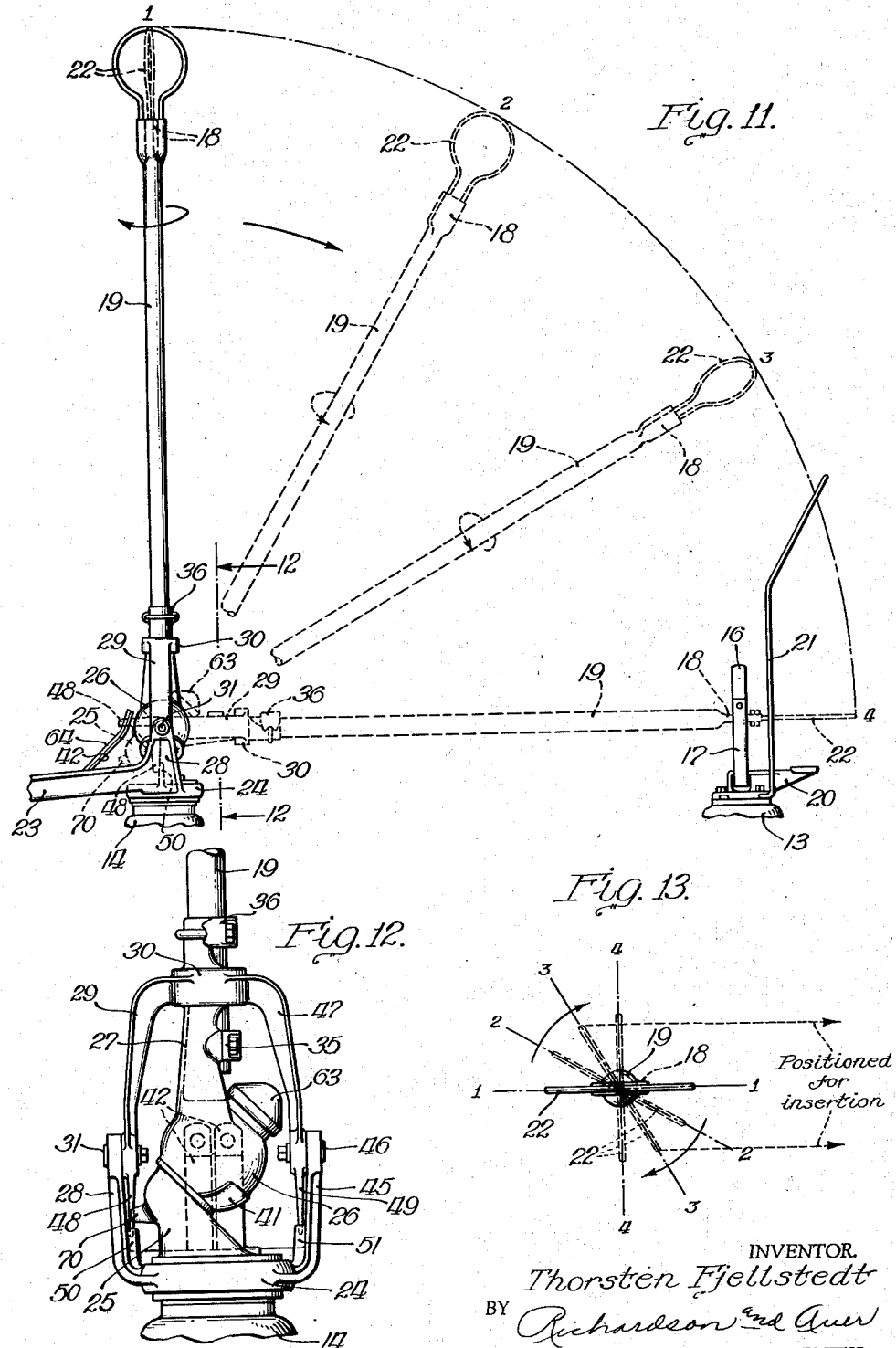

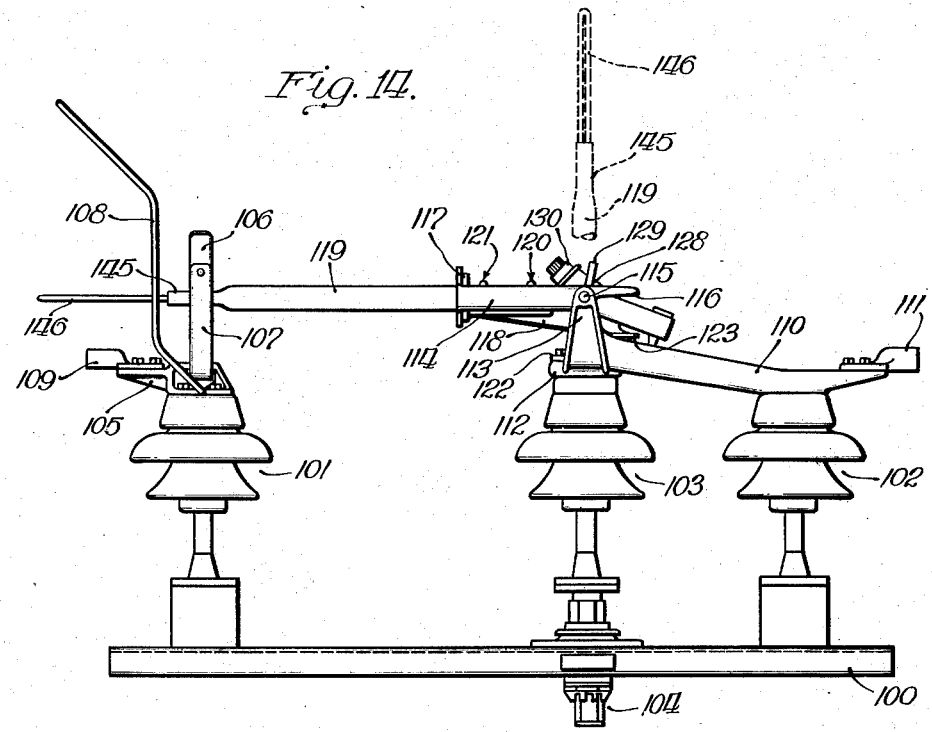

Feb. 18, 1941.   T. FJELLSTEDT   2,231,992
MEANS FOR CONTROLLING CURRENT
Filed Nov. 18, 1938   11 Sheets-Sheet 7
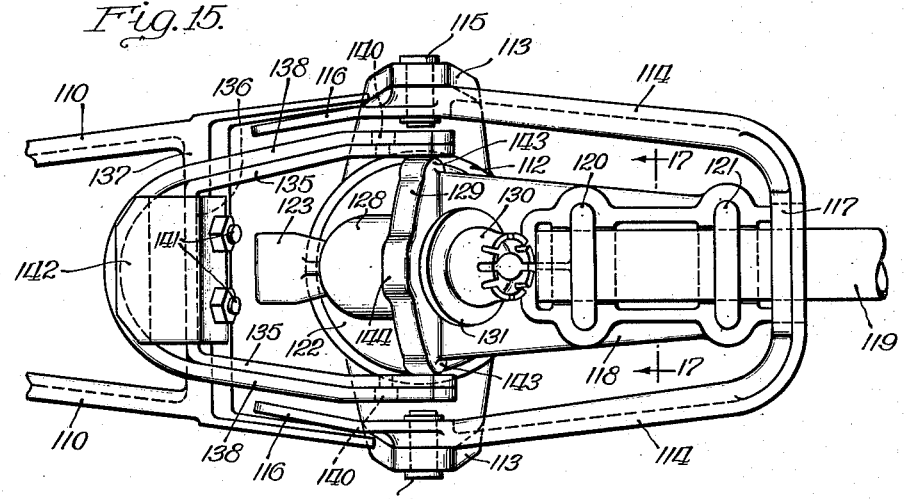
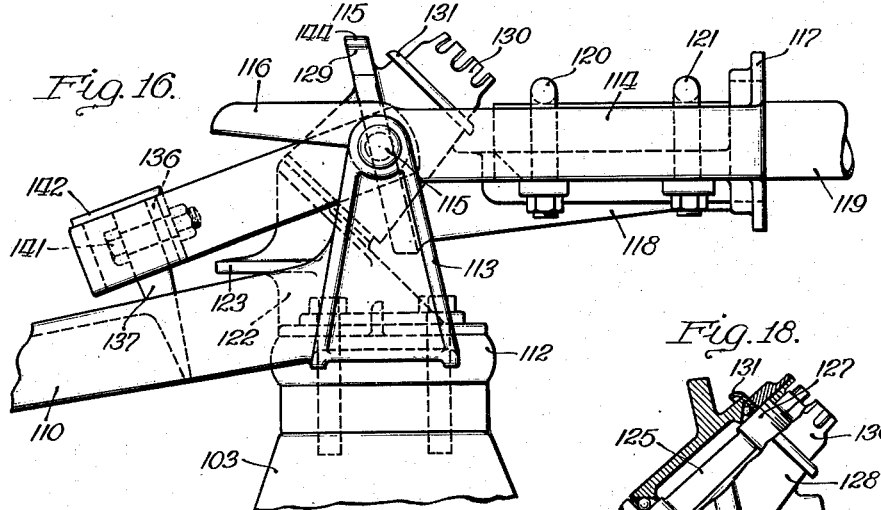
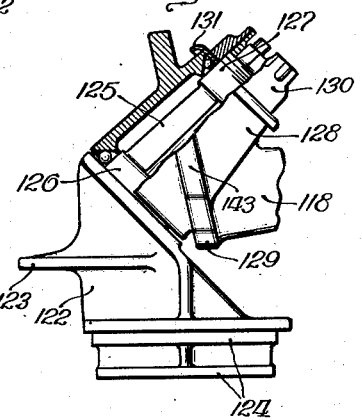
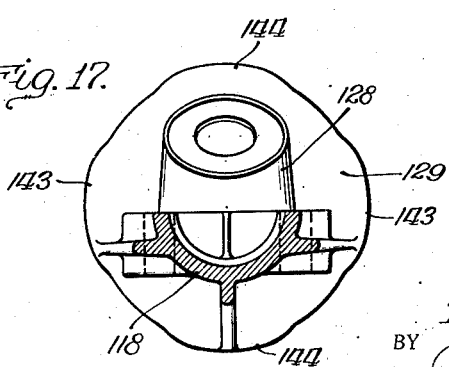
INVENTOR.
Thorsten Fjellstedt
BY Richardson and Auer
ATTORNEYS.

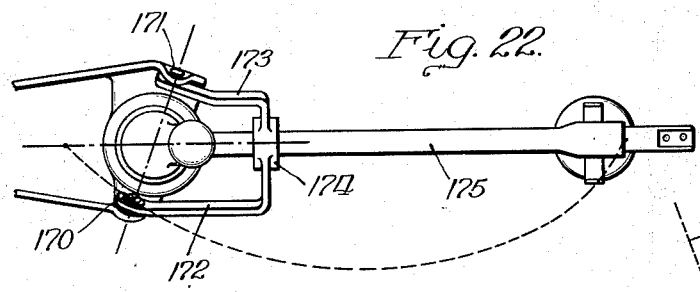
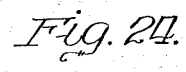
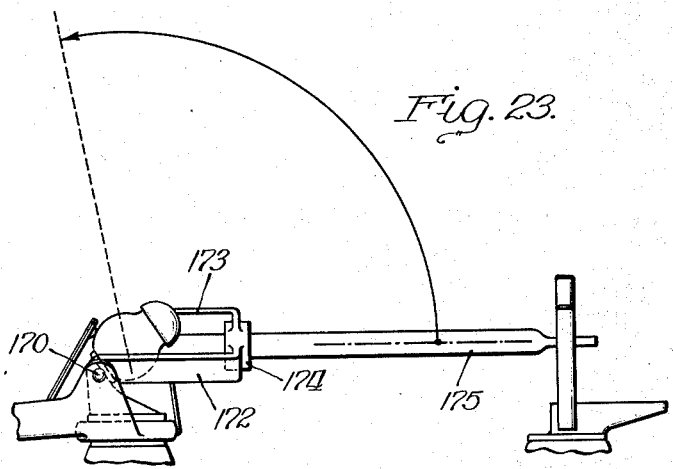
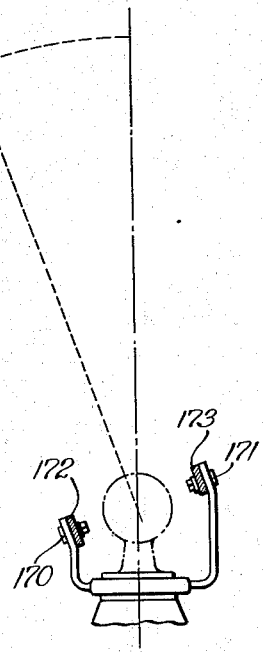
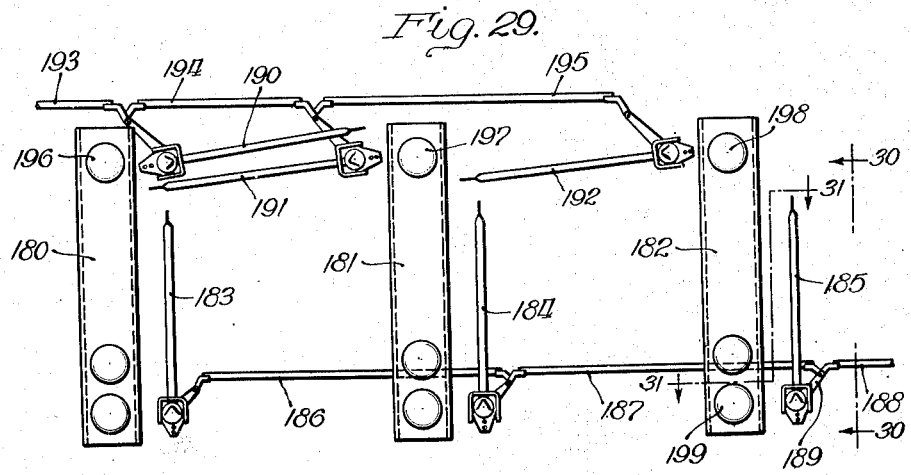

Feb. 18, 1941.  T. FJELLSTEDT  2,231,992
MEANS FOR CONTROLLING CURRENT
Filed Nov. 18, 1938  11 Sheets-Sheet 9
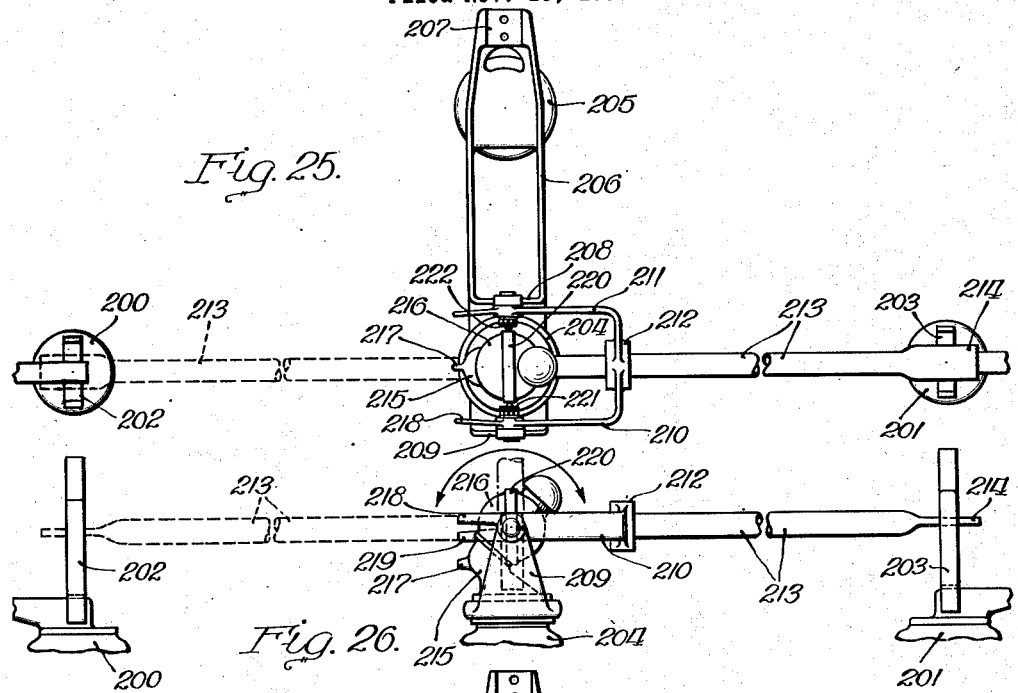
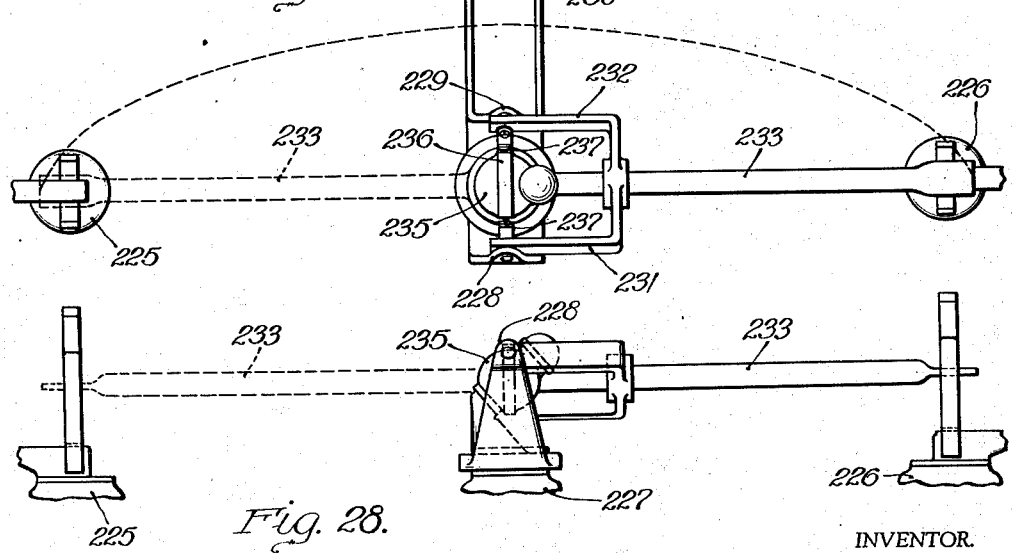
INVENTOR.
Thorsten Fjellstedt
BY Richardson and Auer
ATTORNEYS Feb. 18, 1941.　　　T. FJELLSTEDT　　　2,231,992
MEANS FOR CONTROLLING CURRENT
Filed Nov. 18, 1938　　　11 Sheets-Sheet 10
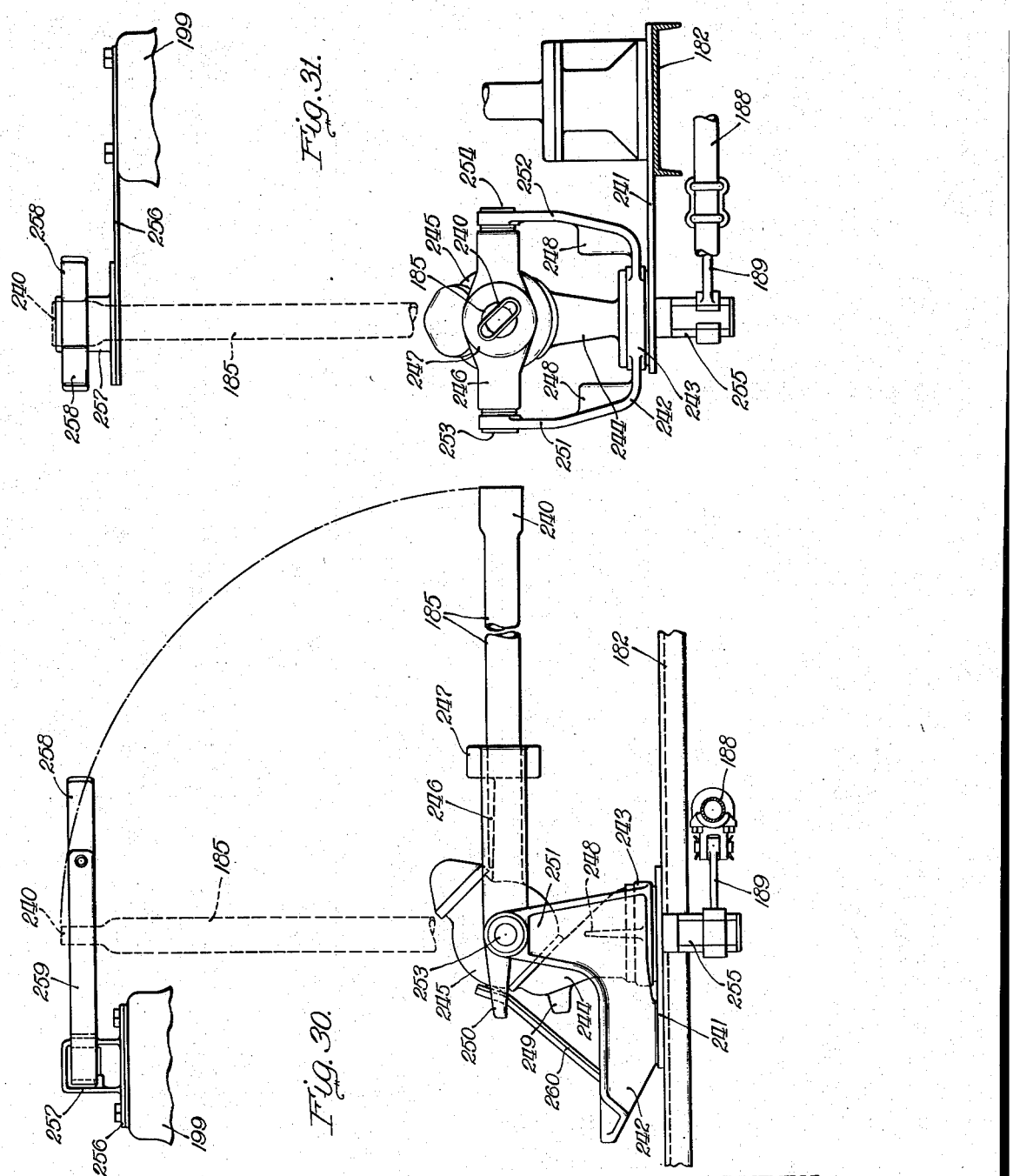
INVENTOR.
Thorsten Fjellstedt
BY Richardson & Guer
ATTORNEYS.

Feb. 18, 1941.  T. FJELLSTEDT  2,231,992
MEANS FOR CONTROLLING CURRENT
Filed Nov. 18, 1938  11 Sheets-Sheet 11

INVENTOR.
Thorsten Fjellstedt
BY Richardson & Guer
ATTORNEYS.

Patented Feb. 18, 1941

2,231,992

UNITED STATES PATENT OFFICE 2,231,992

MEANS FOR CONTROLLING CURRENT

Thorsten Fjellstedt, Chicago, Ill., assignor to Delta-Star Electric Company, Chicago, Ill., a corporation of Illinois Application November 18, 1938, Serial No. 241,216

26 Claims. (Cl. 200—48)

This invention relates to switches and the like, and is particularly useful in connection with structures provided for carrying heavy currents.

The general object of the invention is the provision of a device comprising a new mechanism carrying a conductor, for example, a switch blade for relative movement and high pressure contact engagement, with respect to a distantly disposed stationary conductor or contact means.

The new mechanism incorporated in the switching devices disclosed herein utilizes a novel mechanical movement and new principles of operation, and for convenience of description is termed an "actuating mechanism." It is movably mounted on a rotatable insulating stack and carries a switch blade for high pressure contact engagement and disengagement with a distantly disposed stationary contact. Responsive to the rotation of the rotatable stack, the mechanism causes a composite movement of the switch blade through an arc to and from the distantly placed stationary contact means either along the longitudinal axis of the device or deflected therefrom, and coincident therewith, during certain phases of the arcuate movement, it causes a rotary angular movement of the switch blade around its own axis for the purpose of effecting the high pressure contact relative to the stationary contact means in the terminal or operating positions of the device. The movable actuating mechanism itself is, in certain embodiments of the invention, in operative conductive relation with a conductor or stationary contact means affording a high pressure point and wiping contact to insure good electrical connection without the use of extraneous flexible conductors.

Another object of the invention is concerned with the provision of new means for securing the reliable high pressure contact engagement between the conductors having movement relative to each other. This object is realized in the case of certain embodiments of the movable actuating mechanism by associating therewith novel contact means including a floating pressure member and providing pressure means which exert in the critical operative positions of the device a wiping cam or wedge action thereon so as to effect the required high pressure contact engagement. Similar floating contact means are also provided in the case of the stationary distantly disposed contacts into which the contact portion of the movable conductor or switch blade is inserted. The high pressure contact engagement is in this case effected by moving the switch blade contact edgewise into position with subsequent angular rotation so as to exert on the floating contacts a wedging, wiping, or spreading action which secures the high pressure contact engagement. Contrariwise, during the disconnect operation, the switch blade is rotated first so as to place its contact portion edgewise relative to the stationary contact to facilitate the withdrawal required for breaking the current connection. In other words, the blade contact is rotated angularly with respect to the stationary contacts, upon initiating the disconnect operation and before commencing the withdrawal operation, and is also rotated angularly with respect to the stationary contacts upon terminating the switch closing operation to effect the high pressure contact engagement.

Still another object relates to the provision of a novel arcing horn used with specific embodiments of my invention, namely, with the switch structures described herein. The arcing horn is rounded throughout and does not have either edges or corners, thus constituting a closed loop, and therefore does not cause either a tip corona or radio interference.

Examples of the invention are shown in the accompanying drawings in connection with high pressure contact switches for closing and for breaking electric circuits carrying heavy loads. However, the principles involved in the invention may have a wide application in industry aside from such switches, and it should therefore be understood that specific disclosures are not made herein to indicate any inherent limitations as to the use of the invention, but only to show some of the uses to which it may be put in practice.

The previously noted objects and other objects and features, relating to locking provisions as well as to numerous structural and functional improvements in addition to those mentioned above, will appear from the detailed description which follows, with reference to the drawings. In these drawings, Fig. 1 shows a side view of a switch embodying my invention in one modification thereof;

Figs. 2, 3, and 4 are somewhat enlarged views of the detail parts of the switch shown in Fig. 1, namely: the device previously referred to as actuating mechanism is shown in a side view in Fig. 2; the stationary contacts and arcing horn assembly with the movable conductor or switch blade in closed position in engagement with the stationary contacts are illustrated in Fig. 3; and a transverse view of the stationary contacts taken along line 4—4 of Fig. 3 with the switch blade in section is indicated in Fig. 4;

Fig. 5 represents a top plan view of the mechanism shown in Fig. 2;

Fig. 6 illustrates a top plan view of the arcing horns assembly with certain parts removed to show details more clearly;

Fig. 7 is a top plan view of part of the main frame on which the actuating mechanism is mounted;

Fig. 8 shows a longitudinal section through the actuating mechanism taken along the longitudinal axis of the device as indicated at line 8—8 of Fig. 5;

Fig. 9 is a section along line 9—9 of Fig. 5 and illustrates the journal or pivot connection of the blade carriage guide;

Fig. 10 shows a section through a support or crank member on which the blade carriage is movably mounted, as seen along line 10—10 of Fig. 8, also indicating certain stop members in engagement;

Fig. 11 illustrates the arcuate and the angular rotary movements of the switch blade with respect to the stationary contact assembly;

Fig. 12 is a plan view of the actuating mechanism in disconnect end position of the device, as seen along line 12—12 of Fig. 11;

Fig. 13 shows an edge view of the switch blade and arcing horn and indicates diagrammatically certain phases of its angular rotary motion from connect to disconnect position which correspond to the phases of its arcuate motion, as illustrated in Fig. 11;

Fig. 14 represents a side view of a modified embodiment;

Figs. 15 to 18 are details of the modification shown in Fig. 14;

Figs. 19 to 21 and 22 to 24 are simplified views of further embodiments of the structures wherein the switch blade describes a motion through an arc which is deflected from the line of the longitudinal axis of the device;

Figs. 25–26 and 27–28 represent double throw switches embodying the features disclosed herein;

Fig. 29 illustrates diagrammatically a plan view of a 3-pole switch with typical arrangements of grounding switches made and used in accordance with the invention;

Figs. 30 and 31 show two views of a grounding switch and as used in the arrangement represented in Fig. 29.

Figure 32:
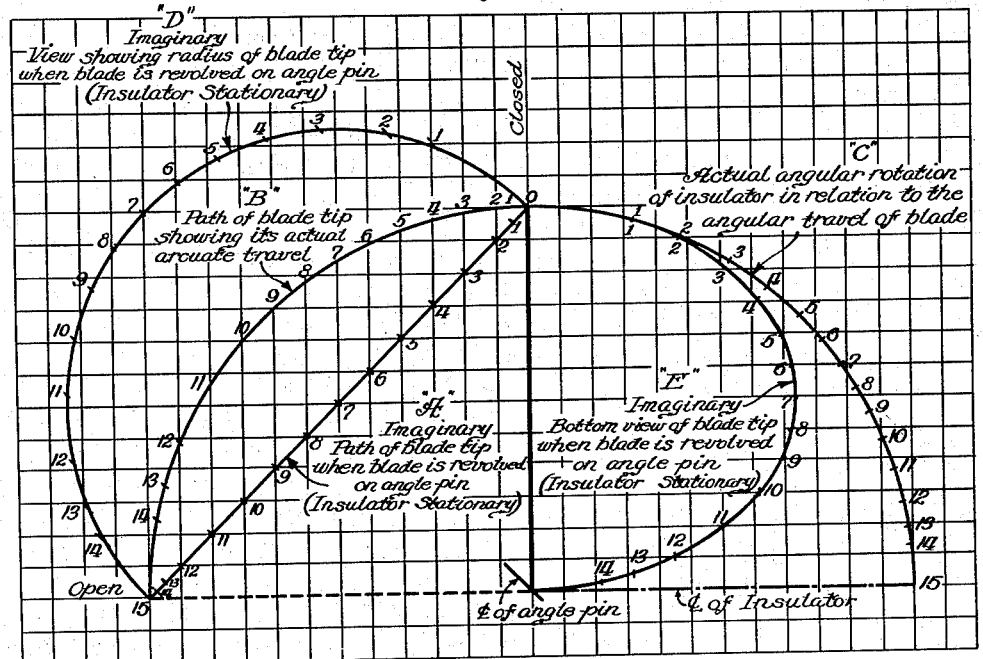
Figs. 32 and 33 illustrate the switch operations graphically in geometrical representation.

Like parts are indicated throughout the drawings by like reference numerals. The description rendered below presents the invention by first explaining the respective assemblies generally, then explaining the detail parts of any one embodiment, and finally furnishing explanations covering the cooperation thereof. Details of mechanical parts or principles of their operation that may safely be presumed to be well known will be discussed only where it is required for an understanding of the invention.

Referring now to Fig. 1, numeral 11 indicates a base carrying two stationary insulating stacks 12 and 13 and a stack 14 which is rotatably mounted on the base, for example, by means of ball bearings, the stack having an extension 15 provided for the attachment of suitable actuating means. The stack 14 may be rotated manually or by means of a suitable drive mechanism; in brief, it may be actuated in any desirable, suitable or required manner. Mounted on the stationary stack 13 is the stationary contact assembly comprising U-shaped contacts and associated floating U-shaped pressure members having legs 16 and 17, respectively, for receiving the flattened contact portion 18 of the switch blade 19 in high pressure contact engagement therewith. The contact assembly is attached to the support 20 which is secured on the stack 13 and carries the arcing horn 21, and also the terminal clamp means 40 for securing the corresponding line conductor. At the end of the contact portion 18 of the switch blade 19 is attached the companion arcing loop 22. This assembly will be presently described in detail with reference to other figures of the drawings.

The other stationary stack 12 carries one end of the frame member 23 which is suitably attached thereto (for example, by screws, as shown at the left hand side of Figs. 2 and 5). Secured to this end of the frame 23 is also the terminal clamping means 43 for the attachment of the corresponding line conductor of the circuit which is to be controlled by the device. The other (inner) end of the frame 23 is made in the form of a circular bearing 24 which is disposed coaxial with the rotatable stack 14 for journalling the upper end of this stack and the actuating mechanism provided thereon. Integral with this circular bearing portion 24 and angularly extending therefrom are two arms 28 and 45 forming a U-shaped cradle for pivoting a certain guide member, the pivot points 31 and 46 (Fig. 5) in these arms constituting the fulcrum for the rotation of the switch blade 19 through its arcuate connect and disconnect motions with respect to the distantly disposed stationary contacts.

The actuating mechanism comprises a crank member 25 which is rotatable with the stack (in the journal 24 of the frame 23) and carries a bearing pin or shaft, the axis of which is disposed at an angle to and intersecting the axis of the stack. Rotatably journalled on this angle shaft or pin of the crank 25 is the blade carriage having in this embodiment a substantially spherical pivot portion 26 and a carrier extension 27 for supporting the switch blade 19. The pivot portion 26 is provided with a cam-like contact hump or contact projection 41 which, in the closed or operative position of the device as shown in Fig. 1, is in high pressure contact engagement with contacts provided on springs 42 mounted on a transverse ridge of the frame 23, as will be subsequently described in detail. The arms 28 and 45 of the frame 23 provide the above noted pivot points 31 and 46 for the arms 29 and 47 of the blade carriage guide which is equipped with a journal or bearing portion 30, furnishing a bearing support for the blade carriage extension 27 and for the blade 19. The pivot points 31 and 46 for the arms of the blade carriage guide are disposed along the line of the axis of the rotatable stack and substantially along the meridian line of the spherical pivot portion 26 of the blade carriage. The inner end of the switch blade 19 is secured on the carriage extension 27 by means of suitable clamps, such as 35 and 36.

Neglecting for a moment any other structural details, and examining Fig. 1 which shows the device in closed position with the blade contact 18 in transverse position within and in high pressure contact engagement with the U-shaped contact means of which portions 16 and 17 are visible, and taking into consideration Fig. 5 which shows that the axis of the switch blade 19 is in alignment with the longitudinal axis of the device and also in alignment with the axis of the angle pin of the crank member, it will at once be seen that the switch blade is locked in this (closed) position against any inadvertent displacement. Any force applied to the switch blade in an attempt to move it out of its closed position would fail, due to the angular position of the crank pin. If it is assumed now that the stack 14 is rotated to effect the disconnect operation, such rotation will cause a number of simultaneous and successive actions: first, the crank member 25 is rotated with the stack (being secured to the stack and journalled in the bearing portion 24 of the frame 23), and angularly displaces the angle pin on which is journalled the spherical pivot portion 26 of the blade carriage 27. This displacement is radial and angular with respect to the stack axis. The angularly disposed journal or bearing pin carried by the crank member 25 therefore tends to move or displace the blade carriage by an amount proportionate to its own radial or angular displacement. The blade carriage, and with it the blade, 19, in response to this operation initially rotates around its own axis and thereby tilts its flattened contact portion 18 angularly with respect to the U-shaped contacts in which the contact portion is disposed when the disconnect operation commences. The angular displacement of the crank pin also releases the locked condition of the switch blade; second, as the rotation of the stack 14 continues, causing progressive angular displacement of the crank member 25, the blade is lifted and moved progressively through an arc away from the stationary contact assembly 16—17, with the pivot points such as 31 of the blade carriage guide 29 as a fulcrum, its angular rotation around its own axis continuing throughout most of the arcuate movement, until the blade is disposed substantially at an angle of 90° from the closed position in which it is shown in Fig. 1. The contact portion 18 of the blade is at that moment, just before concluding the rotation of the stack 14 to complete the opening operation, in a position which is also substantially at right angle to the position in which it is shown in Fig. 1. The blade 19 with its contact 18 is thus initially rotated or twisted edgewise within the stationary contacts, relieving the contact pressure thereof, and to this motion is added the arcuate movement which removes the blade and its contact portion from engagement with the stationary contact assembly. The third phase of the operation can now be considered. The angle pin of the crank member 25 has been angularly rotated (with the stack 14) by about 90°, and the axis of the blade is disposed substantially coaxial with and in continuation of the axis of the stack 14, while the flattened contact portion 18 of the blade is disposed at a slight angle to the longitudinal axis of the device. The switch blade is now substantially in its alternate (open) terminal position. Further rotation of the stack 14 now rotates the blade around its own axis, in a direction which is opposite to its angular rotation during the arcuate disconnect movement (but in the direction of rotation of the stack 14), again twisting or turning the contact portion into a transverse position with respect to the longitudinal axis of the device. If a contact were provided at this extreme, open or normal position of the apparatus, (as it may be provided in some embodiments), it will be seen at once that the blade contact would have been inserted therein edgewise and then twisted into high pressure contact engagement in the same manner as the contact engagement is accomplished in the closed position shown in Fig. 1. This feature is useful in a certain embodiment of the invention which will be presently described in detail with reference to grounding switches.

The disconnect operation is now completed. The blade 19 is displaced by 90° from the position shown in Fig. 1, and its axis is substantially in alignment with the axis of the rotatable stack 14. All movable parts (stack, crank, blade carriage, blade) have been moved through an angle of substantially 90°, and the blade has described a double angular rotation around its own axis, first by about 90° from the transverse position of its contact portion 18 into alignment with the longitudinal axis of the device, and then a twisting movement in reverse direction to position the blade contact again transverse to the longitudinal axis. In the disconnect position, as shown in Figs. 11 and 12, the switch blade is locked against inadvertent motion to either side due to the angular displacement of the axis of the crank pin with respect to the stack axis.

As will be seen later on, certain parts, for example, the stack and the crank member, are angularly rotatable in excess of 90° to obtain the correct positioning of the blade and its contact portion in the terminal positions. The term "substantially," or its equivalent as used herein, is intended to cover any such angular excess motion required to obtain the described results, and where a motion or displacement of 90° or more is mentioned without qualification, this is intended to mean that the corresponding part is displaced by at least that amount, without regard to its total actual angular movement.

The above described operation will appear more clear from the detailed discussion of the cooperating parts, which is rendered below with reference to Figs. 2 to 10, inclusive.

The main frame 23 of the actuating mechanism is supported at one end on the stationary stack 12. The clamp member 43 (Fig. 1) for attaching the terminal of the corresponding line conductor to this end of the switch is not shown in these figures. The frame 23 is a casting which comprises the tapering sides 23—44 (Fig. 5) terminating at the inner end in a circular bearing portion 24 which is coaxial with the axis of the stack 14, and having two arms 28 and 45 for receiving journal pins 31 and 46, respectively, so as to pivot the arms 29—47 of the blade carriage guide provided with the journal portion 30. This guide is also equipped with extension levers, as indicated at 48—49, for alignment with a projection 70 on the crank member 25 when the device is in disconnect position, as shown in Figs. 11–12. As has been noted previously, the device is then in a locked position, and the projection 70, upon initiating the connect operation, engages one or the other extension 48 or 49 (depending in which direction the device is operated) and exerts a pressure upon the blade carriage guide to start its arcuate closing movement under the control of the rotary stack 14. Stop members 50—51 are provided on the frame, in the form of protruding ribs, as shown particularly in Fig. 10, for engagement with extension levers such as 48—49 carried by the blade carriage guide and for engagement with the tip of the stop member 55 to limit the opening and closing movement of the mechanism.

The crank member 25 is a casting having a flange 52 and a reduced bearing portion 53 (Fig. 8) which is inserted through the opening in the circular bearing portion 24 of the main frame and is provided at its end with a thread for receiving the bearing ring 54. Ball bearings are inserted and the ring 54 is put in place and suitably tightened, whereupon the crank member 25 is firmly attached to the upper portion of the stack 14 by suitable screws, as shown. The crank is thus coaxial with the stack and rotatable with it. The crank member 25 has a central rib 54' (Fig. 10) and, as already noted, is also provided with the stop member 55 which determines the rotary actuating movement of the stack in one or the other direction by engagement with one or the other stop member or rib 50 or 51 projecting from the inner or journal portion of the main frame. The stop member may, of course, be attached to the flange 52 of the crank in reverse position, using for this purpose the two screws shown at the bottom of Fig. 10 opposite the two screws which hold the stop member 55, as shown. The proper attachment of the stop member 55 is determined by the direction of rotation of the stack (and of the crank member attached thereto) to actuate the switch from open to closed position. This rotation is assumed in Fig. 10 to be clockwise, whereby the blade 19 (as shown in Fig. 11) is also moved clockwise to assume the closed position as shown in Fig. 1. The tip of the stop 55 is then in engagement with stop 51 (Fig. 10), thus definitely limiting the closing operation. The actuating mechanism can also be used to operate in the reverse direction, that is, the stack may be rotated counterclockwise to effect the closing operation; and in this case, the placement of the stop 55 would have to be reversed so as to define and limit the closing operation by engagement of the tip of the stop 55 with the rib 50, as mentioned above. A stop member such as 55 is used in a single pole switch and may be dispensed with in a double throw switch where the switch blade may be rotated substantially through an arc of 180° alternately into and out of engagement with one of a pair of oppositely disposed stationary contact assemblies, as indicated, for example, in Figs. 25–26 and 27–28.

The central rib 54' of the crank member 25, as is particularly apparent from Fig. 10, is radially offset with respect to the axis of the flange 52 (and stack 14) and carries a flange 57 (Figs. 2 and 8) which is disposed at an angle (e. g., substantially 45°) with respect to the stack axis. This flange 57 constitutes the base of the journal shaft or angle pin 58 (Fig. 8) projecting from the crank for rotatably mounting the blade carriage comprising the pivot portion 26 and the carrier portion 27. The crank member 25 thus functions in the nature of an eccentric whose crank or journal pin is disposed at an angle to the plane of its rotation.

The blade carriage is a suitable casting having within its pivot portion the internal journal rings 59 (Fig. 8) which engage the inner journal portion of the angle pin 58, and the externally threaded internal journal ring 60 which engages the outer journal portion of the pin 58. The assembly is held together by the washer 61 which is secured in position by the screw 62 engaging an internal thread in the angle pin 58. The assembly may be neatly finished by means of a cover cap 63 secured to the threaded end 60 of the pivot portion 26.

This pivot portion of the blade carriage is also provided with a contact cam or hump 41, noted previously, for high pressure engagement, in closed or operative position of the device, with the contacts provided on the members or springs 42. The latter are mounted on a transverse rib 65 of the main frame by the use of pressure springs 64 as shown particularly in Figs. 5 and 8. The hump or projection 41 exerts a high pressure on the contacts to obtain a reliable and secure conductive engagement between the movable parts of the device and the stationary contact means thereof.

It may be mentioned at this point that the above noted contact means comprising the cam or hump 41 and the cooperating contacts on members 42 may be replaced, if desired, by a flexible braid, jumper or the like, one end of which may be secured to the rib 65 and the other end to a suitable clamp or terminal provided on the blade carriage 27. Such braid or jumper may also take the place of the corresponding contact provisions shown in other embodiments of the invention.

The extension 27 of the blade carriage is made in the form of a trough for receiving the corresponding (inner) end of the switch blade 19, the attachment being secured by means of suitable clamp members 35—36. The bearing or journal portion 30 of the blade carriage guide, comprising the arms 29 and 47 which are pivoted by means of the pins 31—46 (Fig. 5), supports and guides the blade carriage and the blade through its disconnect and connect movements. It should be considered in this connection that the blade is lifted through an arc from and toward the distantly placed stationary contacts, and at the same time executes a rotary movement around its own axis, as has been mentioned before and as will be explained more in detail later on. This arcuate and angular movement of the blade is thus guided and controlled by the blade carriage guide with the pivot points 31 and 46 as a fulcrum. This guide may receive a different form, particularly in embodiments wherein no locking action in the open position is required, as will be presently explained.

The projection 70 on the crank member 25, in conjunction with the extension levers 48, 49 of the guide, provides the means for initiating the connect or closing movement of the blade carriage (and of the blade) from normal or disconnect position immediately upon commencement of the rotation of the rotatable stack and the crank. The projection 70 is placed adjacent to one or the other lever extension, for example, adjacent to the extension 48 of the leg 29 of the blade carriage guide (see Fig. 12), in the disconnect position of the device, and when the connect operation commences, that is, when the rotatable stack 14 is rotated in order to bring the blade 19 into connect position, as shown in Fig. 1, the projection 70 provides a leverage acting against the extension 48 so as to start the connect movement of the apparatus. It is advisable to provide this means for starting the closing operation of the blade because the mechanism is locked in the disconnect position shown in Fig. 12, against inadvertent displacement, due to the angular position of the crank 25 and with it the blade carriage guide, as previously discussed. A nearly perfect balance, which releases the mechanism from this locking position immediately upon rotating the stack and with it the crank out of the position shown in Fig. 12, can of course be obtained by proper dimensioning and placing the various parts of the mechanism. The unlocking provision just described constitutes a safeguard for proper operation. This feature will be presently explained in detail.

The distantly placed stationary contact assembly cooperating with the flattened portion, that is, with the blade contact 18, and also the arrangement of the arcing horns are shown in detail in Figs. 3 and 4. The support 20 is a casting suitably attached to the stationary stack 13. It carries an extension 75 for holding the terminal clamping means 40 (Fig. 1), and is provided with a ridge 76 for the attachment of a U-shaped contact having the legs 77—78. The upper portions of these legs spread outwardly, as indicated at 16 and 79, in order to receive and guide the contact portion 18 of the blade into high pressure connect position. A U-shaped floating pressure spring member comprising the legs 77 and 80 is attached to the legs 77—78 of the contact spring at its upper end by means of pins or rivets 81—82. The base of this pressure spring loops through an opening 83 provided in the casting of the carrier or support 20. A spacer member 94 is inserted between the legs 77—78 of the contact spring by means of reduced ends 95—96, determining the maximum inward motion or pressure of the contact assembly. The contact portion 18 of the blade 19 is shown in Fig. 4 in section, in connect position, being inserted within the legs 77—78 of the contact spring and placed transverse thereto against inward pressure of the contact springs reinforced by the pressure of the floating pressure member 77—80. The contact portion 18 of the switch blade is also indicated in Fig. 4 in dotted lines somewhat tilted from its connect position in order to indicate its position immediately prior to insertion during the connect movement, or, contrariwise, immediately after commencement of the disconnect movement. In other words, the switch blade contact is swung into the stationary contact in tilted position to facilitate insertion, and is then rotated or twisted around its own axis, thus producing a wedging, wiping and spreading action against the pressure of the contact springs to insure the required high pressure contact engagement. Upon opening the switch, this engagement is first broken by rotating or twisting the switch blade around its own axis prior to lifting it out of the U-shaped contacts.

The stationary arcing horn, as well as the movable arcing loop attached to the switch blade may also be described with reference to Figs. 3 and 4 in conjunction with Fig. 6. The stationary arcing horn comprises the loop having the legs 21 and 84. Extensions 85—86 are provided at the bottom of this arcing horn and are inserted below the cap or cover member carried on the support 20, the cap having suitable channels for receiving these extensions. The attachment of the arcing horn is obtained simply by securing the support 20 on the stationary stack by means of screws extending through the cap as indicated in the drawings, Figs. 3 and 4. Fig. 6 shows the top plan view of the assembly with the contact means omitted and the cap removed to show the extensions 85—86 of the arcing horn. Attention is called to the fact that this arcing horn constitutes a complete loop without any projections or corners whatsoever, and therefore no tip corona can occur, and substantially no radio interference can take place. The movable arcing horn or loop which is carried by the switch blade is of a similar structure and comprises the legs 22 and 88 (Fig. 6). The inner ends of these legs are inserted into the flat and reduced contact portion 18 of the tubular switch blade 19, interposing a suitable spacer member 90, as shown in Fig. 6, and closing the assembly with a rounded cap 91. The assembly is held in position by means of a bolt and nut arrangement, as indicated at 92. The switch blade and its flattened contact portion are shown in Fig. 6 in dotted lines to illustrate the attachment of the arcing loop. Again, as in the case of the stationary arcing horn, this arcing loop is completely rounded, has no edges or corners, and consequently no tip corona or radio interference can occur incident to the connect or disconnect operation of the switch.

The operation may now be reviewed with reference to Figs. 11, 12, and 13, assuming that the switch is in normal or disconnect position, and is actuated to the connect position in order to effect engagement of the blade contact with the distantly disposed stationary contact. The apparatus is shown in Figs. 11 and 12 in disconnect position, that is, with the switch blade 19 placed substantially coaxial with and in continuation of the axis of the rotatable stack 14. The switch blade contact 18 and its associated arcing loop 22 are now disposed tilted at an angle to the line of the longitudinal axis of the device, as shown in dotted lines in Fig. 11, but it should be understood that the position of the blade contact is at this moment of no particular importance because no operative function is to be performed. The exact angular position of the blade will depend on the extent of rotation of the rotatable stack in the direction of the disconnect position. Seen from the side (Fig. 11) the crank member 25 is now displaced somewhat in excess of 90° from the position in which it is shown in Fig. 1 and other figures. The connect positions of the crank and of the switch blade, as well as the blade carriage and the carriage guide (corresponding to the position shown in Fig. 1) with the parts 25—70, 63, 29—48, and likewise, 19, 18, 22, are shown in Fig. 11 in dotted lines. Fig. 12 shows the mechanism in disconnect position, as seen along the line 12—12 of Fig. 11, at the moment when the blade contact 18 and loop 22 are in the full line position (Fig. 11), that is, considering the disconnect operation substantially at the conclusion of the arcuate motion of the switch blade and prior to its angular rotation in its terminal position, or, considering the connect operation, immediately after its angular rotation in the open terminal position and just prior to starting its arcuate movement toward the stationary contacts. The projection 70 of the crank 25 is in this position adjacent to the lever extension 48 of the leg 29 of the blade carriage guide. This projection 70 is now in back of the arm 28 of the main frame and in back of the extension 48, the tip of which is, in turn, in stopping engagement with the stationary stop rib 50 to limit and to define the open position of the carriage guide. These parts were positioned in this cooperative relation by rotating the rotatable stack in a direction opposite to the direction indicated by the arrow on the (open) switch blade 19 (Fig. 11), so as to move the blade out of engagement with the stationary contacts (dotted closed position) into its open position. The crank was rotated during this operation so as to displace the projection 70 angularly substantially by 90°, and the blade guide with its arms 29 and 47 was rotated counter clockwise from its dotted position (Fig. 11) and placed its extension 48 in engagement with the stop 50 and adjacent the projection 70 in Fig. 12. A slight additional rotation of the rotatable stack will cause a rotation, i. e., an angular displacement of the blade around its own axis, and the arcing loop 22 will then assume approximately the position indicated in Fig. 11 in dotted lines. The switch is now in its open locked position. The opening operation can be accomplished in either direction of rotation of the rotatable stack. If it is desired that the stack should be rotated in a direction opposite to the one described above, the action of the various parts will be operatively identical except that their cooperative relation is reversed. The projection 70, instead of co-acting with the extension 48 on guide arm 29 would then coact with the extension 49 on guide arm 47.

The contact hump or cam 41 on the pivot portion 26 of the blade carriage was likewise displaced during the disconnect operation and is now out of engagement with the contacts carried on the bars or spring members 42. The axis of the shaft or angle pin of the crank member 25, on which is pivoted the blade carriage, was in the locked connect position of the switch (Figs. 1, 2, 5, 8) substantially in alignment or coextensive with the longitudinal axis of the device extending along line 8—8 in Fig. 5, and is now in locked disconnect position of the switch, as shown in Figs. 11-12, angularly displaced and, therefore, substantially transverse to its former position. An inadvertent dislocation of the switch from this open position is excluded under ordinary operating conditions because of the locking action which the actuating mechanism exerts due to this angular placement of the angle pin relative to the axis of the blade and the axis of the rotatable stack which in its effect is not unlike a toggle action.

This locking action will be realized from an examination of Fig. 12. It will be recalled that this figure shows the angular position of the apparatus just prior to rotating the switch blade into its final angular open position, (indicated in Fig. 11 by its dotted arcing horn 22). The crank member is, therefore, in reality slightly displaced from the position shown in Fig. 12 by the amount of the over-drive applied in the terminal position. However, it may be assumed, for explaining the locking action, that the mechanism is in the position shown in Fig. 12 and that a force is exerted on the switch blade 19 to move it perpendicularly out of the plane of the drawing, with the pivot points 31 and 46 of the blade carriage guide as a fulcrum. The axis of the switch blade, being in this position of the apparatus substantially coextensive with the axis of the rotatable stack 14, produces by the angular position of the crank member 25 with respect to the stack and blade axis a condition of locked balance or equilibrium which must be disturbed before the blade can commence its arcuate connect movement toward the stationary contacts. So long as this condition exists, a force exerted on the switch blade merely produces a pressure on the angle pin of the crank tending to move or push the crank sideways (i. e., along the longitudinal axis of the device) with respect to its point of attachment on the stack 14 which is insufficient to rotate the crank member (and with it the stack) due to ineffective leverage, and produces a binding action as in a toggle link. The action is likened to a toggle merely for the sake of description, in order to support the understanding. This locking balance of the device, in its open or disconnect position, is sufficient safeguard against any accidental forces that might occur under normal operating conditions tending to move the switch inadvertently from open to closed or connect position. In order to initiate the closing operation, it is necessary that the rotatable stack, and with it the crank member, be rotated to displace the latter, i. e., to displace the angle pin angularly to a point where the arcuate closing movement of the switch blade can be effected, and it is further necessary to break the locking condition so as to prevent any stress on the mechanism upon starting the rotation of the stack 14.

Assuming now that the stack 14 is rotated in the closing direction (direction of the arrow on switch blade 19, in open position, shown in Fig. 11), the immediate result is a rotation of the crank 25 and with it of the blade 19 around its own axis, in the direction of rotation of the stack 14, twisting the blade and its flattened contact portion 18 from its transverse tilted position shown in Fig. 11 in dotted lines to the position 1 shown in full lines. The projection 70 provided on the crank member 25 (Fig. 12) simultaneously moves against the lever extension 48 of the blade carriage guide, and presses against it upon reaching the position shown in Fig. 12, to rotate the guide and with it the switch blade in the direction of the closing operation, around the pivot points 31, 46 as a fulcrum, that is, through the arcuate path from left to right, as seen in Fig. 11, and perpendicularly out of the plane of the drawing, as seen in Fig. 12. The pressure which is thus exerted by the projection 70 on the lever extension of the blade carriage guide upon rotating or twisting the blade into the full line position 1 (Fig. 11) is intended to break the locking condition of the mechanism and to position the device to carry out the connect operation responsive to further rotation of the stack 14. The angle pin of the crank is simultaneously angularly displaced to a position wherein the arcuate movement of the blade can commence. The action of the projection 70 on the lever extension 48 is therefore, as mentioned previously, in the nature of a precaution rather than an absolute necessity, because a nearly perfect balance can be obtained by properly dimensioning and positioning the various parts, so as to produce the locking effect in disconnect position (Figs. 11 and 12), and to break the locking action as soon as this balance is destroyed by rotation of the crank 25 as a consequence of a rotation of the stack 14, biasing the crank angle pin and with it the blade carriage and blade to respond to the further rotation of the stack without any binding action.

The continued rotation of the stack and of the crank progressively displaces the axis of the crank pin, moving it angularly and radially with respect to the stack axis toward the closed position in which the mechanism is shown in the previously discussed drawings. The effect is a rotation of the switch blade 19, through stages as indicated in Figs. 11 and 13 by numerals 2, 3, and 4, Fig. 11, showing the principal stages of the arcuate movement of the blade, and Fig. 13 indicating edge views of the blade 19 with its contact portion 18 and its arcing loop 22 in the angular positions approximately corresponding to these stages of the arcuate blade travel. It will be seen that the movement of the blade is a composite one. In the first place, the blade rotates around its own axis, from normal (tilted disconnect position shown in dotted lines) to full line position 1 (Fig. 11), twisting in the direction indicated by the arrow, which is the direction of the stack rotation, and then gradually rotating through the arcuate path toward the stationary contacts from position 1 through positions 2 and 3 to position 4 (Fig. 13), at the same time rotating around its own axis. The angular rotation of the blade around its own axis, during its arcuate travel, is in reverse direction to its initial rotation because it is a function of the rotation of the blade carriage (and blade) around the angle pin of the crank, while the initial rotation from the dotted line open position to the full line position 1 is only a function of the stack rotation. The maximum rotation occurs after the blade contact has reached and has been inserted into the stationary contact, that is, roughly, between positions 3 and 4 (Fig. 13). The blade contact is thus again rotated and twisted into high pressure contact engagement. Coincident with this angular axial displacement the blade describes the arc (Fig. 11) which finally brings it into the connect position in engagement with the contact assembly provided on the stationary stack 13. The angular positions of the blade, as shown at 1, 2, 3, 4 in Figs. 11 and 13, are more or less schematic to indicate its rotation around its own axis and to demonstrate that the maximum angular blade rotation takes place near and at the terminal positions. A rule as to the true angular positions of the blade at any one moment during its arcuate travel cannot be derived from this showing and cannot be given except for a certain embodiment, as will be presently explained more in detail. This will be understood when it is considered that the device is adjustable and, so far as its use and operation are concerned, reversible. In other words, the end or terminal positions of the blade are subject to adjustment and control, and are therefore variable and individual to any given embodiment of the structure, and it follows, therefore, that the intermediate positions are likewise variable and can be determined only for each individual embodiment. In certain cases, the closed and open positions of the switch may be reversed entirely as will be described later on, and such reversal would, of course, be reflected in the angular positions of the blade during its arcuate travel.

However, it may be stated as a rule that the ratio of rotation of the blade around its own axis to its arcuate movement is not proportional throughout its operation. The blade rotates in the direction of the stack rotation a considerable amount when the closing operation is started, then it commences to rotate in opposite direction with continued and increasing arcuate motion toward the stationary contacts, and its angular rotation increases and accelerates again upon insertion of the blade contact 18 into the stationary contact at the time when the arcuate motion is almost completed. The contact portion 18 of the blade enters the contact assembly in a tilted position (approximately position 3, Fig. 13) with respect to the U-shaped contacts, as is also indicated in Fig. 4 in dotted lines. As the arcuate motion of the blade continues, the blade is gradually inserted in this tilted position into the contacts and straightens transversely in a wiping, wedging and maximum rotating motion to effect the high pressure contact engagement.

The pivot portion 26 of the blade carriage also rotates by about 90° from its disconnect position (Fig. 11) to the connect position (Fig. 1), and rotates the cam-like hump 41 toward and into high pressure engagement with the contacts carried on the springs 42. The hump 41 is so dimensioned that the high pressure contact engagement is established prior to the blade contact 18 entering into the distantly disposed contact spring.

It will thus be seen that the high pressure contact engagement is effected gradually in the terminal positions of the stationary distantly disposed contacts as well as the stationary contacts associated with the actuating mechanism, with a wedging and wiping pressure action, and that this action is also effective during the disconnect operation of the device to release the contact pressure upon return of the device to normal position. The cam hump 41 on the pivot portion of the blade carriage is in this embodiment entirely removed from engagement with the contacts on springs 42 when the blade has reached a position with respect to the stationary contacts and arcing horn where no transfer of current can occur. The return to normal operation as well as the connect operation of the apparatus are thus free of any friction load that could hamper or impede the movements of the various parts.

The embodiment shown in Figs. 14 and 18 will be described next, and it is believed that the corresponding explanations can be somewhat abbreviated where parts of like or substantially like construction and function are involved. The principal difference between this embodiment and the one just described resides in the structure of the actuating mechanism. Instead of using a blade carriage having a substantially spherical pivot member, this embodiment uses a bushing-like pivot member carrying a flange-like cam which takes the place of the contact hump or projection of the previous embodiment. Another difference resides in the arrangement of the contacts cooperating with the actuating mechanism. Floating contacts are used in this embodiment to cooperate with the cam flange on the bushing-like pivot portion of the carriage member. The placement of parts is also somewhat modified.

Referring now to the assembly shown in Fig. 14, the base 100 carries the stationary stacks 101 and 102, and a rotatable stack 103. The latter is provided with an extension 104 for effecting the rotation either manually or by motor drive according to any desired or required operating conditions. The stationary stack 101 carries the mounting member 105 for supporting the contact spring assembly comprising the U-shaped flaring springs 106 and the floating U-shaped pressure member 107, and the arcing horn 108. Attached to the mounting member 105 is also the clamp means 109 for receiving the corresponding line conductor.

The stationary stack 102 supports the outer end of the main frame 110 which is equipped with the clamp means 111 for receiving the other line conductor. The inner end of the frame 110 forms a cradle as in the previously described structure and terminates again in a circular bearing race 112 which is disposed in axial alignment with the rotatable stack 103, and is provided with two arms indicated at 113 for pivoting the blade carriage guide 114 at pivot points 115, as is clearly shown in Fig. 15. The guide arms are equipped with extension levers 116 for initiating the closing operation of the switch from the open position under the control of the projection 123 on the crank member 128, in a manner similar to that in which the extensions 48—49 of the previously described embodiment initiate the closing operation responsive to the action of the corresponding projection 70. The base of the arms 114 of the guide is made in the form of a journal or bearing member 117 embracing the bearing portion of the blade carriage 118. The inner end of the switch blade 119 is placed in the trough-like blade carriage extension 118 (best shown in Figs. 16 and 17) and is secured thereon by means of suitable clamps, such as 120 and 121.

Secured on the rotatable stack 103 and rotatable therewith, through the medium of the journal portion 112 of the cradle formed by the frame 110, is the crank member 122 (Fig. 18) which is provided with a projection 123 having the purpose of starting or initiating the closing movement of the switch blade, as noted in the previous paragraph. Examining this crank member somewhat more in detail, it will be seen that it is equipped with the journal portions 124 for insertion into the circular bearing portion 112 of the main frame 110. It also carries a shaft or pin, the axis of which is at an angle to the axis of rotation of the crank (axis of the rotatable stack) and is referred to as the angle pin, or pivot pin for the blade carriage. The angle pin carries two bearing portions 126—127 on which is journalled the blade carriage 128 having the carrier extension 118 and a cam flange 129. The assembly is held together by means of a lock nut 130 and a washer 131.

The axis of the angle pin 125 of the crank member is offset with respect to the axis of the rotatable stack, and is disposed at an angle thereto, as in the previously described structure. In the connect position of the switch, as shown in the drawings, the axis of the angle pin is in alignment with the longitudinal axis of the device, and in open or disconnect position it is angularly displaced by approximately 90° and is disposed substantially transverse thereto. These features correspond largely to the corresponding features described in connection with the previous structure. However, instead of employing a substantially spherical body for the pivot portion of the blade carriage, the corresponding part of this embodiment is made in the form of a bushing-like portion with the cam flange 129 which takes the place of the contact hump 41 of the first structure.

This cam flange, as shown particularly in Fig. 15, cooperates with the substantially U-shaped contact member or spring comprising the legs 135, the base 136 thereof being mounted on the transverse rib 137 extending from and between the legs of the main frame 110. A U-shaped floating pressure spring having the legs 138 reinforces the action of the contact member. The contact member and the pressure spring may be held together by means of pins or rivets such as 140, which may be secured to the pressure member with the reduced ends inserted into corresponding holes in the spring. The base 136 of the contact member is fastened to the transverse rib 137 of the main frame by means of a nut and bolt 141 and a bracket 142 (Figs. 15-16) which prevents the displacement of the pressure spring 138 relative to the legs of the contact member.

The cam flange 129 carries two pairs of raised cam portions 143 and 144 which are displaced relative to each other, as shown in Fig. 17. In the operative position of the switch in which it is shown in Fig. 14, that is, with the switch blade in connect position, the raised cam portions 143 are in high pressure engagement with the contacts on the legs 135 of the contact member; and, inasmuch as the mechanism is angularly rotated from one extreme position to the other, as previously described, the cam portions 144 will be in high pressure engagement with the contacts in the disconnect position. The cam flange, due to its angular position on the angle pin 125 executes a rocking motion with respect to the contacts to effect the high pressure contact engagement of its raised portions 143 and 144 in the terminal positions. The raised cam portions cause a spreading and the action of the contact spring will therefore again be a wiping and wedging action, producing the high pressure contact. A flexible braid or jumper may be used in place of this contact arrangement. One end of the jumper would then be connected to the rib 137 (Figs. 15-16), and the other end to a suitable terminal on the blade carriage extension 118.

The operation of this embodiment is in general similar to that of the first described structure. The stationary contact assembly comprising the springs 106 and 107, as shown in Fig. 14, may also be generally similar to the corresponding assembly of the first described structure. The flattened contact portion 145 of the switch blade 119 thus cooperates with the stationary contacts in like manner. The arcing loop 146, shown in Fig. 14, which is carried by the switch blade 119, may receive a form slightly different from the one of the previous structure. The end of the switch blade 145 with its loop 146 is shown in Fig. 14 in disconnect position of the switch, in dotted lines, and it will be seen that this loop may simply receive the form of a hairpin with the ends of its legs inserted and suitably clamped in the flattened contact portion 145 of the switch blade, in a manner similar to the attachment of the arcing loop of the previously described structure.

The rotatable stack which operates and controls the actuating mechanism is disposed, in the structures described in the foregoing, substantially in parallel with the stationary insulating stacks. If desired, the rotatable insulating stack may be disposed at an angle to the stationary stacks, and the switch may then be operated from one definite terminal position into the other with the switch blade in disconnect position beyond and at an angle to the axis of the stack. In other words, instead of operating the device from the closed position into a balanced locked open position, the switch blade may describe an arc in excess of 90° and come to rest in a position where no locking or toggle action takes place, and accordingly no unbalancing is required for initiating the return or closing movement. This particular embodiment has not been shown because it is believed to be self-explanatory from what has been said with respect to the previously described structures. However, inasmuch as no locking action takes place in the open position of the switch, the provisions for unlocking or biasing the switch blade to start the closing movement can be dispensed with, and a simpler blade guide can be used, for example, a pair of fixed guide members forming a segmental track along the line and in the plane of the blade motion. The blade would move within this fixed guide track.

The angular position of the tip of the switch blade in its terminal positions is naturally a function of the extent of rotation of the rotatable stack and with it of the blade carriage pivoted on the angle pine of the crank member. In the embodiment shown in Figs. 1, 11 and 14, the tip of the blade, that is, its flattened contact portion, is in the connect position at right angle to the axis of the rotatable stack and substantially in transverse position within the stationary contacts. The connection, that is, the movement of the switch blade from open to closed position, is obtained by rotating the rotatable stack through 90°, and the pressure-contact position of the blade contact, as above described, is secured by a slight over-drive. The limit of rotation of the rotatable stack is controlled and defined by a stop member such as 55 (Fig. 10) carried on the flange of the crank member and cooperating with suitable stop means, such as the ribs 50 or 51, projecting from the (stationary) journal portion of the main frame within which the crank member rotates. Similar limit stop means are also provided on the structure described with reference to the drawings, Figs. 14–18, and one of the limit stops can be seen clearly in dotted lines in Fig. 16. The stop member on the crank may be radially adjustable if desired.

The angular position of the tip of the blade in the open or disconnect position of the device is, likewise, a function of the extent of rotation of the rotatable stack from closed to open position and is thus subject to desired control and proper adjustment. In the embodiments so far discussed, the tip of the blade is, in disconnect position as seen in Figs. 11 and 14, tilted at an angle to the longitudinal axis of the device. As noted already, this particular angular position is, in the open position of the switch, of no particular importance inasmuch as no operative function is performed by the contact portion of the blade; its angularly tilted position merely indicates that the blade is also rotated around its own axis at the end of the arcuate opening movement, and vice versa, also upon initiating the closing operation.

The positioning of the switch blade so that its tip or contact portion is in one or the other terminal position transverse or at right angle to the longitudinal axis of the device is a matter of choice and adjustment, and is accomplished by a slight over-drive in the desired terminal position so as to take advantage of the maximum twisting movement of the blade that occurs in the end position. In the embodiments so far discussed, the over-drive is applied in the closed terminal position, that is, when the switch blade contact is inserted in the stationary contact, as noted in Figs. 1 and 14. If the particular use to which the invention is put requires that the closed and open positions should be reversed from where they are shown in these figures, the device will be properly adjusted and operated so that the over-drive is employed at the end of the other direction of rotation and becomes effective in the opposite terminal position. Such a condition may arise when using the device for a grounding switch, as will be presently explained in detail, after completing the description of certain modifications of the invention. It is, of course, also possible to apply the over-drive, that is, the angular displacement of the rotatable stack and associated parts of the actuating mechanism, in both terminal positions, so as to establish engagement of the movable blade contact alternately with one or the other of two stationary contacts.

Referring now to Figs. 19–21, showing only essential parts of a modification and omitting details already known, such as arcing horns and contact means, as well as terminal provisions, the actuating mechanism is mounted on a rotatable stack 150, and again comprises a main frame having sides such as 151, with the inner end made in the form of a circular bearing member 152 disposed coaxial with the rotatable stack. Two arms 153 and 154 extend from this end of the main frame to provide pivot points 155—156 for the arms 157—158 of the U-shaped blade guide, the base of this guide forming a bearing 159 for the blade 160. The pivot points 155—156, which constitute the fulcrum for rotating the blade, are offset with respect to each other, as is clearly indicated in the drawings. The crank member 161 may substantially correspond to one of the structures already described, having a pin or shaft which is positioned at an angle to the axis of the rotatable stack, and pivoted on this angle pin is again the pivot portion 162 of a blade carriage. This pivot portion is indicated in substantially spherical form, and may be provided with a contact hump or cam for cooperating with the contact springs 163, which may be mounted on the transverse rib or cross arm 164 of the main frame. The stationary stack 165 is provided with the usual support 166 for mounting the terminal means and also the arcing horn and the contact assembly (the latter comprising the springs 167 and the floating pressure members 168). The switch blade 160 is provided with a flattened contact portion 169 which in the connect position of the device, as shown in Figs. 19–20, is in high pressure contact engagement with the contact springs.

The operation of this embodiment is essentially similar to the operation of the previously described structure. However, due to the offset plane of the blade fulcrum (pivot points 155—156) the blade with not describe an arc which is substantially in alignment with the longitudinal axis of the device, but will swing laterally thereto whenever the switch is operated either from the open to the closed position, or vice versa. The path of the blade through the opening movement is indicated in Fig. 19 by the dotted line extending substantially from the center point of the flattened contact portion 169 to the left. Viewed from the side, as shown in Fig. 20, the switch blade 160 will move through an arc which brings it from the closed position indicated in full lines to the open position partially shown in dotted lines at an angle to the axis of the rotatable stack and of the actuating mechanism.

The modification illustrated in Figs. 22–24, inclusive, is in most important points similar to the one just described, except that the pivot points 170 and 171, which constitute the blade fulcrum, are offset in two planes, with respect to the plane of the stack axis, as shown in Fig. 24, and with respect to the plane of the blade axis, as shown in Fig. 22. Pivoted at these points are the arms 172 and 173 of the blade guide having the guide bearing 174. The arcuate path of the switch blade 175 is indicated in the drawings. The operation is substantially identical to that resulting in the embodiment Figs. 19–21, inclusive, except that the blade movement is less extreme.

No locking balance or action that may be likened to a toggle action occurs in these embodiments (Figs. 19–24), in the open position, and no unlocking or biasing provisions of the previously described kind are, therefore, required upon commencing the closing operations. The apparatus is locked in this open position by the angular placement of the blade and crank with respect to the stack axis. Accordingly, the corresponding blade guides are simple U-shaped structures pivoted at their ends on the arms of the corresponding main frames. The lever extensions on the pivoted guide arms of the former embodiments can be omitted, and the crank member need not be equipped with the cooperating projection for initiating the closing movement of the blade or, rather, biasing the blade to execute the closing movement in response to the initial rotation of the stack in the switch closing direction. If desired, the blade guide may also be modified and may be a simple fixed track in the shape of a segment wherein the blade moves through its arcuate connect and disconnect motions. In the closed position, the apparatus is locked against inadvertent displacement in the same manner as in the case of the structures described before.

The choice of using one or the other of the embodiments described above will depend on and will be largely dictated by operating conditions and requirements, taking into consideration such factors as, for example, the size of the switch, the space available for its performance, the location of mechanisms or structures in its neighborhood, etc., etc. The two last described embodiments, wherein the blade swings laterally out of the plane of the device, indicate to some extent the versatility of the invention. This feature may be useful in crowded locations where the switch blade must be moved so as to avoid other mechanisms in its path of travel.

The invention may also be used in double throw switch structures, such as diagrammatically indicated in Figs. 25–26 and 27–28, respectively.

Referring first to Figs. 25–26: Numerals 200 and 201 are oppositely located stationary insulating stacks each carrying stationary contact assemblies, such as indicated at 202 and 203, as well as arcing horn and line terminal clamps, the latter having been omitted in the drawings in order to simplify the explanations. A rotatable stack 204 carrying an actuating mechanism similar to the one described in Figs. 1–13, inclusive, is disposed between these stationary stacks. Another stationary supporting stack 205 is placed adjacent the rotatable stack 204 and spaced therefrom for mounting one end of the main frame 206 at right angle with respect to the longitudinal axis of the entire apparatus which extends from the assembly on stack 200 to that on stack 201. The line terminal may be attached to a suitable clamp means provided at 207 on the main frame 206. The main frame carries two arms 208 and 209 for pivoting the legs 210 and 211 of the blade carriage guide having the journal member 212 embracing a suitable bearing on the blade or on the blade carriage. The blade 213 is shown in full lines in connect position, with its flattened contact portion 214 in high pressure contact engagement with the stationary contact springs 203 on stack 201. The actuating mechanism comprising the crank member 215 and the blade carriage 216 which is rotatably carried thereon may be constructed substantially in the manner previously described. However, inasmuch as the switch blade of this double-throw switch is locked in its disconnect position (partially shown in dot-dash lines in Fig. 26) means must be provided for unbalancing the toggle lock in either direction in which the switch is to be moved for establishing contact engagement either with the stationary contacts 202 or with the stationary contacts 203. The crank 215 is for this purpose again provided with a projection 217 for cooperation with the extension levers 218 and 219, respectively, in one or the other direction of operation from the normal locked open position. Each of the arms 210 and 211 of the blade carriage guide is provided with forked extension levers such as shown in Fig. 26 at 218—219. The space or notch between the forks of each extension lever is always in alignment with the blade axis. The projection 217 on the crank 215 is, in open position of the switch blade, between the legs such as 218 or 219, of one of the extension levers of the guide arms 210 or 211, depending on the direction of rotation of the stack 204 originally determined for carrying out the switch operations. For example, if the rotation of the stack 204 is to be clockwise for disconnecting switch blade 213 from engagement with contacts 203 and for connecting the blade with contacts 202, the projection 217 will cooperate with extension levers on the guide arm 211 to bias the blade in the proper direction of operation from open to closed position with respect to either one of the stationary contacts. If the rotation of the stack 204 is to be in reverse direction, counterclockwise as seen in Fig. 25, for removing the switch blade from engagement with contacts 203, the projection 217 will cooperate with the forked extension levers 218—219 on the guide arm 210. Assuming, for example, that the switch blade 213 is removed from engagement with the contacts 203 on the stationary stack 201 and placed in its locked disconnect position responsive to counter clockwise rotation of stack 204, as seen in Fig. 25, the forked extensions 218—219 on leg 210 of the blade carriage guide rotate counter clockwise, as seen in Fig. 26, at the same time as the crank 215, together with the projection 217, rotates angularly counter clockwise together with stack 204. The projection 217 thus rotates into the space between the legs 218—219, and remains in this position so long as the switch is in open position. Upon operating the rotatable stack in one direction or the other so as to obtain engagement with one of the stationary contacts 202 or 203, the projection 217 will initially exert a pressure on one of the extensions 218 or 219, depending upon the direction of rotation, to effect the desired closure, and will assist in the unbalancing or unlocking of the actuating mechanism for executing the corresponding connect movement.

The switch blade 213 is shown in the alternate connect position in dotted lines. In order to move the switch blade from one extreme connect position into the other, for example, from engagement with the contacts 203 into engagement with the contacts 202, requiring an arcuate motion through 180°, it is, of course, necessary that the rotatable stack be likewise rotated through substantially 180°, not counting the angular rotation, i. e., the over-drive in excess thereof to provide for the proper positioning of the blade contact within the corresponding stationary contacts. It is, in other words, necessary, and will be apparent from remarks previously made, to provide for a slight over-drive in either direction of rotation to position the blade contact properly with respect to the corresponding stationary contact so as to obtain the required wiping and wedging high pressure contact action. The device is, of course, locked against inadvertent displacement in closed position with the blade contact in engagement with either one of the stationary contacts.

The actuation of the rotatable stack 204 would thus require a drive which alternates from clockwise to counterclockwise direction, or vice versa. The projection 217 on the crank member would then cooperate with one or the other pair of extensions, such as 218—219 on either the guide arm 210 or 211 to break the locked disconnect position and to bring about the arcuate motion of the blade in the direction of the two oppositely located stationary contacts. However, the apparatus may also be operated by rotating the rotatable stack in a single direction, in steps conforming to the open and closed positions. The projection 217 on the crank would then cooperate alternately with one of the extensions on each of the guide arms 210 and 211, depending on the direction of the uniform rotation decided upon.

The embodiment shown in Figs. 25–26 requires a slightly different arrangement of the contact provisions associated with the actuating mechanism. As shown, the pivoted portion 216 of the blade carriage is provided with a substantially circular cam-like rim or projection 220 co-operating with contacts mounted on springs 221 and 222. The contact portion 220 is preferably made in the form of a cam with raised portions providing for high pressure wiping contact engagement in the corresponding operating positions of the apparatus. This cam-like contact portion moves in a rocking action with respect to the contacts, remaining in alignment therewith but in angularly changing relation thereto during actuation from one to the other operating position. A flexible braid or jumper may be used in place of this contact-cam-spring arrangement in accordance with remarks made for corresponding details of previously described embodiments.

Figs. 27 and 28 show a double-throw switch for the same general purpose as the one just described, but using the principles and structure as explained with reference to the embodiment shown in Figs. 19–21 or 22–23, wherein the path of the tip of the switch blade is deflected from the longitudinal axis of the apparatus.

Numerals 225 and 226 indicate again stationary stacks, and 227 is the rotatable stack. The arms 228 and 229 of the main frame 230 are offset with respect to the plane of the blade axis so as to provide an offset fulcrum for the arms 231—232 governing the movement of the blade 233. The details of the actuating mechanism are substantially the same as discussed in connection with the above noted previously described figures. No provision is made for initiating the connect movement in either direction from the normal disconnect position of the switch, because no unlocking is required. The pivoted part 235 of the blade carriage guide is again equipped with a contact surface 236 which cooperates with oppositely located contacts 237. This contact surface may again be in the form of a cam so as to provide high pressure contact engagement in the respective operating positions of the device. The arcuate blade path of the switch blade 233 is indicated in dotted lines in the plan view Fig. 27.

The rotatable stack 227 of this embodiment may be actuated by a drive alternating from clockwise to counterclockwise direction. The device is locked in either closed position by the alignment of the angle pin with the longitudinal axis of the device, and is secured against inadvertent displacement in open condition by the angular position of the angle pin with respect to the stack axis.

The structures so far described cover cases where the invention is applied to switches for making and breaking connection between current-carrying conductors, for example, line conductors, switching conductors, bus bars, and the like. However, this does not exhaust the possibilities of the invention; it may be employed in many cases, and its features will frequently furnish unusual advantages. As an illustration of the mobility and versatility of the invention may be mentioned its use in connection with grounding switches, as illustrated in Figs. 29, 30, and 31.

Fig. 29 shows diagrammatically a plan view of a 3-pole switch. Numerals 180, 181 and 182 are bases, each carrying insulating stacks to form an assembly supporting a switching apparatus such, for example, as illustrated in Fig. 1. The insulating stacks in these bases are merely diagrammatically indicated in the drawing Fig. 29, and the switches supported thereon are entirely omitted, for the sake of avoiding unnecessary repetitions. The grounding blades may be arranged alongside of the respective bases, in parallel thereto, as shown at 183, 184 and 185, or they may be arranged between the bases and transverse thereto, as indicated at 190, 191 and 192. The latter arrangement is preferable and should be used wherever possible, but the former may be employed where there is little space between the phases and where current conditions are such as to permit the parallel disposal of the grounding blades without causing detrimental effects in view of the load carried on the lines or on the system. The actuating mechanism of any of these switches is in either case carried on a suitable bracket attached to the corresponding base. The blades are shown in Fig. 29 in disconnect position. The contacts for each blade are carried on a suitable bracket projecting from the live or upper end of the insulator stack shown adjacent each actuating mechanism. The operative (grounding) actuation of each switch requires, therefore, a blade movement through an arc perpendicular out of the plane of the drawing Fig. 29, to position the contact portion at the end of each blade in high pressure engagement with its associated grounding contact. In its operated position, any grounding blade will therefore be disposed alongside of and coaxial with the insulator stack carrying its grounding contacts. In order to move a blade into its operated position, its actuating mechanism must be properly rotated so as to position the blade perpendicular to its position shown on the drawings. Each set of grounding blades or switches 183–185 or 190–192, respectively, is equipped with interconnecting pipes 186, 187, 188 or 193, 194, 195, respectively, for simultaneous operation through suitable drive and control means. Link and lever means are shown in the drawing for connecting each switch for gang operation in an obvious manner, and a detailed description of these means is therefore omitted.

However, attention may be called to the directional movement of the switches of each set, which indicates the versatility of the invention. The operating movement of the three switch blades 183, 184, 185 is in a direction requiring actuation of the drive means (pipes 186—188) from right to left, which causes rotation of the actuating mechanism of each grounding blade in counter clockwise direction to furnish the required connect or grounding displacement. The grounding blades 190, 191, 192 (if such arrangement is used in place of the one just mentioned) must also be rotated perpendicularly out of the plane of the drawing to assume their operative (grounding) positions in high pressure engagement with the corresponding contacts mounted on the insulators 196, 197, 198, respectively. It will be seen, however, that blades 191 and 192 must rotate from left to right in order to align with the insulators 197 and 198, while the blade 190 must rotate oppositely from its horizontal position (as shown in the drawing) to its vertical grounding position alongside insulator 196. This operation is possible because the invention furnishes a switch which is operatively reversible. The blade may be moved from one position into the other by rotating the actuating mechanism in either direction.

One of the grounding switches, for example, the one having the blade 185, may now be described in detail with reference to Figs. 30 and 31, representing a side view and an end view, respectively, as seen along the correspondingly marked lines in Fig. 29. These views are somewhat simplified and several parts are omitted or broken away to emphasize more important details.

As indicated in Figs. 30 and 31, the actuating mechanism is similar to the one already described in connection with previous embodiments. It comprises a main frame or cradle 242 which is mounted on a bracket 241 extending from the base 182. The cradle has a substantially circular journal portion 243 on which is rotatably mounted the crank member 244 carrying the projection 249 (for initiating the operation from the locked connect position), and having an angle pin for rotatably supporting the pivot portion 245 of the blade carriage. The frame or cradle is also equipped with arms 251 and 252 providing the pivot points 253 and 254 for the arms of the blade carriage guide 246 which has the journal portion 247. The blade 185 with its flattened contact tip 240 is shown in its locked disconnect position in full lines and in its locked connect position in dotted lines. Internal stop ribs such as 248 are provided for cooperation with a stop member attached to the crank 244 so as to limit and define the extent of motion in the connect position. An operating pin 255 extends downwardly and is connected to a link 189 which in turn connects through a clevis with the interconnecting pipe 188, as shown.

The grounding contact is again a U-shaped contact member with flaring ends 258, which is carried on a support 257, the latter being mounted on a member 256 which is attached to the upper live end of the insulating stack 199. A floating pressure spring 259 may be provided to furnish the requisite contact pressure.

In normal position, that is, in locked disconnect position, the blade is disposed horizontally in parallel with the base. The end view (Fig. 31) shows that the flattened contact tip 240 of the blade 185 is normally in slightly tilted position. Responsive to rotation of the actuating mechanism, that is, of the actuating member or crank 244, the blade 185 is rotated around the pivot points 253 as a fulcrum and finally assumes its vertical position after rotating through an arcuate path of substantially 90°. In its vertical connect position the blade is in high pressure contact engagement with the legs of the contact spring 258 and is disposed transverse thereto. The blade guide is also displaced angularly by 90°, and the extension levers 250 on the legs 246 of the blade guide are substantially along the line of the axis of rotation of the mechanism. The projection 249 is adjacent one or the other extension lever 250, depending on the direction of rotation of the crank member. Contacts provided on the bars or members 260 are in high pressure engagement with a contact hump or projection on the pivot portion 245 of the blade carriage. The operation is therefore substantially like that of the previously described actuating mechanisms. It should be noted, however, that the transverse position of the flattened contact portion 240 of the blade is obtained in the locked connect position which in this case is the position of the mechanism with the switch blade 185 aligned with the axis of rotation of the crank. In the previous embodiments this position was the locked disconnect position. The angular rotation of the blade around its own axis from its tilted (disconnect) terminal position shown in Fig. 31 to its transverse (connect) terminal position with respect to the contacts 258 takes place coincident with and during the arcuate movement of the blade, and particularly near and in the latter terminal position. The position of the contact portion 240 of the blade when the switch is normal is, as shown in Fig. 31, functionally immaterial because no operation is to be performed. The high pressure contact engagement at the operative terminal position (connect position) in which the flattened blade contact 240 must be transverse to the contacts as shown, is again obtained through a slight over-drive in the corresponding direction of rotation of the actuating mechanism to move the blade into its proper connect position with the previously described wiping and wedging action.

Figure 33:
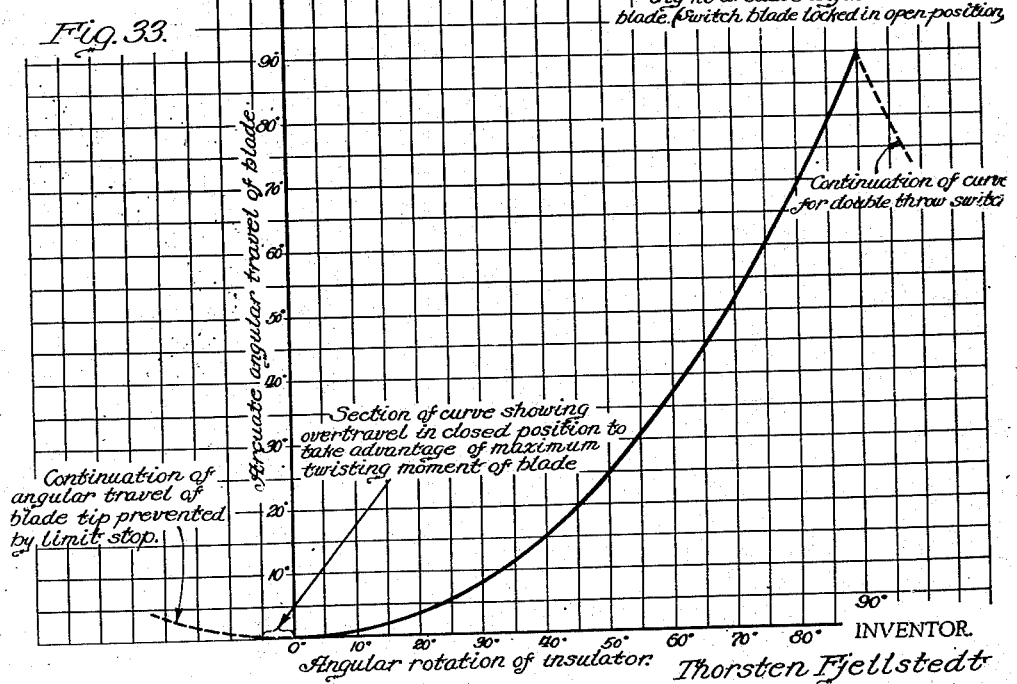

The operation of a switching device made in accordance with the principles discussed in the foregoing may now be summarized with reference to the graphic representations shown in Figs. 32 and 33. These figures cover the operations of a device made, for example, in accordance with the structures shown in Figs. 1, 11 or 14, but they are, nevertheless, also largely true of other embodiments.

Referring first to Fig. 32, the full vertical line indicates the switch blade in closed position, and the dotted horizontal line extending from the vertex to the left marks the blade in open position. The intersecting angular line at the vertex of the angle formed by the terminal positions of the blade indicates the center line or axis of the angle pin (of the crank member) on which the blade rotates. The hypotenuse (curve A) is formed by an imaginary line which designates the path of the blade tip upon rotating the blade on the angle pin with the rotatable insulator (carrying the crank member) held stationary. Curves D and E are imaginary views of the angular displacement of the blade during its travel along the imaginary line A. These three curves will be better understood when it is imagined that the mechanism consists merely of the angle pin and the blade carriage and blade rotatably mounted thereon, and that the blade is revolved on the pin from one end or terminal position to the other, with the angle pin held stationary. In other words, it must be imagined that the blade (heavy vertical line) is taken, for example, by hand and revolved out of the plane of the drawing around the stationary angle pin until it is in the dotted horizontal position. The blade tip will then move through curve A and its angular position incident to its travel will conform to curves D and E, the points marked on the curves in numerals correlating the angular and arcuate positions of the blade during its movement from one end position to the other.

The curve (B) adjacent the hypotenuse (curve A) shows the path of the blade tip when the blade is actually operatively moved from one to the other terminal or end position responsive to the rotation of the rotatable insulator. The corresponding actual angular rotation of the insulator in relation to the arcuate movement of the blade (curve B) is shown in curve C on the right hand side above the horizontal dot-dash line indicating the center line of the rotatable insulator stack. It should be noted that the axis of the blade, when in closed position, is at right angle to the axis of the insulator stack, and coaxially in alignment therewith when the blade is in open position, which corresponds to the embodiments described in connection with the previously mentioned figures. The increments of travel plotted on the hypotenuse A are imaginary positions during the assumed rotation of the blade around the angle pin with the insulator held stationary, and the numerals on each of the other curves indicate coincident points plotted during the movement of the corresponding parts and correlate their relative positions for any cycle of operation in one or the other direction of operation.

Assuming now that the insulator stack is angularly rotated from 0 (closed position of the apparatus) to position 1 (curve C), the blade tip will have been displaced likewise in an arcuate motion from 0 to 1 (curve B), but the increment of arcuate travel is very much smaller. This means that the insulator rotates a considerable extent but that the blade contact executes only a very much smaller movement out of the contacts in which it is inserted in the closed position of the switch. As a matter of fact, the initial operation is a twisting motion of the blade and the arcuate withdrawal motion commences after the blade has been twisted with respect to the contacts. The blade is thus angularly turned or twisted around its own axis, that is, it is angularly displaced during the phase of operation from position 0 to position 1, as shown on curves D and E; this angular displacement being substantially proportionate to the angular displacement of the insulator stack. Stating this performance in other terms of operation, the blade is initially twisted and rotated around its own axis upon starting the disconnect rotation of the rotatable stack so as to relieve the high pressure contact engagement and to facilitate withdrawal of the blade contact from the stationary contacts. The arcuate (withdrawal) movement of the blade, which commences after the blade is twisted angularly, is very much smaller for this phase of operation. The rotation of the insulator stack continues in progressive increments of angular displacement, and when the insulator has been rotated by about 45° (point 5 on curve C), we obtain, by referring to similarly marked points on curves B, D and E, the corresponding arcuate and angular blade positions. It will be seen that the blade has moved through an arcuate path of roughly only 20°, but has angularly rotated a very considerable amount around its own axis during this 45° rotation of the insulator stack. Progressive increments of travel and displacement of the various operating parts can be similarly traced by correlating the points plotted on the corresponding curves. The ratio of angular and arcuate displacement of the blade continues disproportionately between points 5 and 10; that is, the stack rotates roughly by 22° from its 45° position (point 5) to its 67° position (point 10) while the blade describes an arcuate path of about 25° and an angular rotation around its own axis by approximately the same angle. A sharp change in the ratio of motions can be observed again between positions 14 and 15, that is, near and at the end of the opening operation. A large increment of angular displacement of the blade conforms to a large increment of angular rotation of the insulator. A 90° angular displacement (rotation) of the rotatable insulator stack from 0 to 15 on curve C causes a 90° arcuate travel of the blade from the connect position indicated at 0 to the disconnect position shown at 15 on curve B and also an angular displacement (rotation) of the blade around its own axis. The increments of movement of these parts are not proportional, particularly near and in the end or terminal positions, and especially upon commencement of the disconnect operation when the blade is moved from its engagement with the stationary contacts and, vice versa, at the end of the closing operation when the blade is angularly twisted into high pressure contact engagement.

Fig. 33 shows the relation and the ratio between the angular rotation of the insulator stack and the arcuate angular travel of the blade more particularly and more in detail. The horizontal axis indicates the insulator rotation from closed position (0) to open position (90°) and the vertical axis shows the corresponding arcuate blade travel. This curve also indicates the over-drive in the closed position of the switch, after the blade has reached its terminal position, wherein the insulator is further rotated by a small amount so as to twist the blade until its contact portion is transverse to the stationary contacts and exerts the maximum pressure on the contacts without causing any arcuate travel of the blade. The extent of over-drive and therewith the extent of movement of the apparatus in the closing or connect direction is determined by the stop means on the crank member in cooperation with the stationary stop means on the main frame of the actuating mechanism.

Commenting briefly on the ratio of blade movement with respect to the stack rotation, and assuming that the switch is operated from open to closed position, it will be seen from the curve, Fig. 33, that the blade covers most of its arcuate path, about 87°, during about 70° of stack rotation. During the remaining 20° angular rotation of the stack, the blade covers only 3° of its arcuate path and its contact portion is thus inserted into the stationary contacts. However, its maximum rotation around its own axis occurs during this phase of the operation and the blade is twisted into position as previously explained. Both the stack and the blade are in terminal position when they have rotated through 90°. The stack is then rotated an additional small amount (over-drive) without causing any arcuate blade travel, taking advantage of the maximum twisting movement which occurs in this position so as to place the blade properly within and in high pressure engagement with the contacts.

During the opening or disconnect movement, the ratio of displacement between stack and blade is reversed as compared with the connect movement. Whereas the blade moved during the connect motion through an arcuate path of only about 3° for the last 20° angular rotation of the stack, it will move during the disconnect operation through an arcuate path of about 52° for 70° initial angular stack rotation and through roughly 38° for the remaining 20° of stack rotation when the open position of the switch is obtained.

The curve reaches its apex incident to the disconnect operation when the insulator has rotated through 90°, which corresponds to a 90° arcuate disconnect travel of the blade. The switch blade is now in open locked position. Further rotation of the insulator in the same direction would produce an arcuate blade motion in opposite direction; i. e., a closing movement in opposite direction, and corresponding displacement of the curve, as shown in Fig. 33. Such operation occurs in a double-throw switch, as previously described.

The operation of the blade, its increments of angular displacement (twist) and arcuate travel (motion with respect to stationary contacts) during the opening operation of the switch are important particularly during the initial stages when the switch blade contact is twisted with respect to the stationary contacts so as to relieve the contact pressure. Its twisting movement is considerable, as it must be at this stage, while its arcuate withdrawal motion is retarded. Once the blade contact is withdrawn from the stationary contacts, the increments of travel and angular rotation of the blade are of subordinate importance because no operative function is to be performed beyond placing the blade into its extreme open position.

The placement of the stationary contacts with respect to the actuating mechanism is a matter of choice. It is merely necessary to dispose and operate the actuating mechanism properly in such a manner that the path which the blade must describe is in the proper direction of operation. The switch, therefore, so far as its use and operation are concerned, is in every respect (rotation, placement of stationary contacts, maximum twisting movement of blade contact in any chosen terminal position, axial and laterally deflected path of blade travel, etc.) reversible, as is shown by the embodiments herein discussed.

The switch, according to the invention, is provided with very few contact points, in fact, with only two principal contact points, one for making contact with a stationary conductor and one intermediate contact taking care of maintaining the circuit over the movable parts. The contact pressure may be suitably chosen to satisfy any given requirements. The device is positive and reliable in its operation, even under sleet conditions, due to the powerful wiping and wedging pressure action of the contacts as described. The device is also safe in operation, due to the locking action of the operating mechanism which eliminates any special locking provisions.

Changes may be made with regard to structural or functional details, or details of assemblies or use, in accordance with requirements that may occur in practice. The foregoing description does not attempt and does not purport to exhaust all possibilities of the invention, either with respect to structural details or regarding its application in part or in toto, but is intended only to show some practical embodiments to guide others in using the invention and in understanding its objects and features. It is therefore understood that the specific disclosures made herein are not to be construed in a limiting sense. What is believed to be new and desired to have protected by Letters Patent of the United States is defined in the appended claims.

I claim as my invention:

1. A current control device comprising a rotatable actuating mechanism, journal means for said mechanism, a conductor pivotally mounted at one end on said journal means and carrying a blade contact at the other free end thereof, distantly disposed stationary contact means, and pivot means in said mechanism for moving said conductor responsive to rotation thereof to position said conductor coextensive with its axis of rotation and alternately rotating said conductor through an arcuate path and simultaneously twisting said conductor angularly around its own axis to position the blade contact thereon in high pressure contact engagement with said stationary contact means.

2. A control device for governing the operation of a movable member relative to a distantly disposed stationary member, comprising a fixed cradle, an actuating mechanism rotatably mounted in said cradle, pivot means for movably supporting one end of said movable member on said mechanism, and guide means for said member pivotally mounted on said cradle along a line intersecting the axis of rotation of said mechanism, said pivot means being effective responsive to rotation of said mechanism to move said movable member through an arcuate path at an angle to the axis of rotation of said mechanism with the pivot of said guide means as a fulcrum to displace the free end of said movable member relative to said stationary member.

3. An electric control device for governing the operation of a movable contact blade relative to a distantly disposed stationary contact means, comprising a stationary frame, an actuating member rotatably mounted in said frame, a pivot shaft on said actuating member extending therefrom along a line angularly intersecting the axis of rotation thereof for pivotally securing one end of said movable contact blade, guide means for said blade pivotally mounted on said frame along a line transverse to the axis of rotation of said actuating member, and means for rotating said actuating member to displace said pivot shaft angularly for moving said contact blade through an arcuate path at an angle to the axis of rotation of said actuating member with the pivot of said guide means as a fulcrum and for simultaneously angularly rotating said blade around its own axis to move the free end thereof into and out of high pressure contact engagement with said distantly disposed stationary contact means.

4. An electric control device for governing the operation of a movable contact blade relative to a distantly disposed stationary contact means comprising a stationary frame, an actuating crank member rotatably mounted with respect to said frame, pivot means on said crank member extending therefrom along a line angularly intersecting the axis of rotation thereof, a carriage member pivotally mounted on said pivot means of said crank member, means for securing one end of said movable contact blade on said carriage, guide means secured in journal relation with said blade and pivotally mounted on said frame along a line transverse to the axis of rotation of said crank member, means for rotating said crank member to displace said pivot means angularly for moving said contact blade through an arcuate path with the pivot of said guide means as a fulcrum and for simultaneously angularly rotating said blade to move the free end thereof into and out of high pressure contact engagement with said stationary contact means, and means for limiting the extent of rotation of said crank and the arcuate and angular displacement of said blade in either direction of operation.

5. In a control device, a rotatable support, an actuating mechanism mounted thereon, an operating member mounted on said mechanism for movement relative to said support, said mechanism comprising a crank member rotatable with said support and carrying a pin extending therefrom at an angle intersecting the axis of its rotation, means for pivotally securing one end of said operating member on said crank pin, and means for rotating said support to displace said crank pin angularly for moving said operating member alternately from a first limit position wherein its axis is disposed substantially perpendicular to the axis of the support, to a second limit position wherein its axis is disposed substantially coextensive with the axis of the support, said angular displacement of said crank pin also causing angular rotation of said operating member around its own axis coincident with its movement from one limit position to the other.

6. In a control device, a rotatable support, an actuating mechanism mounted thereon, an operating member mounted on said mechanism for movement relative to said support, said mechanism comprising a crank member rotatable with said support and carrying a pin extending therefrom at an angle intersecting the axis of its rotation, means for pivotally securing one end of said operating member on said crank pin, and means for rotating said support to displace said crank pin angularly for moving said operating member through an arcuate path alternately from a first limit position wherein its axis is disposed substantially perpendicular to the axis of the support, to a second limit position thereof wherein its axis is disposed substantially coextensive with the axis of the support, the axis of said crank pin being disposed in said second limit position of the device transverse to the plane of motion of said operating member to lock said member in said position, and means effective upon rotating said support to move said operating member in the direction of the first limit position for breaking said locking action.

7. In a control device, a rotatable support, an actuating mechanism mounted thereon, an operating member mounted on said mechanism for movement relative to said support, said mechanism comprising a crank member rotatable with said support and carrying a pin extending therefrom at an angle intersecting the axis of its rotation, means for pivotally securing one end of said operating member on said crank pin, means for rotating said support to move said operating member alternately from a first limit position wherein its axis is disposed substantially perpendicular to the axis of the support and wherein the axis of said crank pin is in alignment with the axis of the operating member, to a second limit position wherein the axis of said member is disposed substantially coextensive with the axis of the support, the axis of said crank pin being disposed in said second limit position of the device transverse to the plane of movement of said operating member to lock said member against displacement, means effective upon initiating the rotation of said support to move said operating member in the direction of the first limit position for breaking said locking action, and means for definitely limiting the extent of rotation of said support and the extent of movement of said operating member in either direction of operation of the device.

8. In a control device, a rotatable support, an actuating mechanism mounted thereon, an operating member mounted on said mechanism for movement relative to said support, said mechanism comprising a crank member rotatable with said support and carrying a pin extending therefrom at an angle intersecting the axis of its rotation, means for pivotally securing one end of said operating member on said crank pin, and means for rotating said support to displace said crank pin angularly for moving said operating member alternately from a first to a second limit position by rotating said member angularly around its own axis and simultaneously through an arcuate path describing an angle to the axis of said support.

9. In a control device, a rotatable support, an actuating mechanism mounted thereon, an operating member mounted on said mechanism for movement relative to said support, said mechanism comprising a crank member rotatable with said support and carrying a pin extending therefrom at an angle intersecting the axis of its rotation, means for pivotally securing one end of said operating member on said crank pin, and means for rotating said support to displace said crank pin angularly for moving said operating member alternately from a first to a second limit position by rotating said member angularly around its own axis and simultaneously through an arcuate path describing an angle to the axis of said support, the axis of said operating member being disposed in the first limit position substantially perpendicular to the axis of said support and in the second limit position substantially coextensive therewith, and the axis of said crank pin being disposed in said first limit position in alignment with the plane of arcuate movement of said operating member and in the second limit position substantially transverse thereto to lock said member in said second position against arcuate displacement, means effective upon rotation of said support in said locked limit position for moving said operating member out of coextensive alignment with the axis of the support to break said locking action and to initiate the arcuate displacement thereof, and means for limiting the extent of rotation of said support and the extent of arcuate and angular displacement of said operating member in either direction of operation.

10. In a current control device, a movable conductor, a rotatable mechanism carrying said conductor in pivotal relation with one end thereof for moving said conductor through an arcuate path and for simultaneously rotating it around its own axis, a frame for mounting said mechanism, and means for maintaining conductive relation between said frame and said movable conductor comprising yieldable contact means secured to said frame, and cam means on said mechanism effective in the electrically operative position of said device for high pressure engagement with said contact means.

11. In a current control device, a movable conductor, an actuating member for holding said conductor at one end thereof, operating means for moving said actuating member to move said conductor relative to a distant stationary conductor, a frame for supporting said operating means, U-shaped spring means on said frame with its legs extending on opposite sides of said actuating member, contacts on the legs of said spring means, and a cam on said actuating member disposed in alignment with and transverse of said contacts for high pressure engagement therewith in predetermined operating positions of said movable conductor.

12. The combination with a high tension current control switch wherein a movable switching element is disposed between two stationary contacts mounted on stationary insulating stacks, of a grounding switch comprising, a supporting frame disposed adjacent to and near the lower end of one of said stacks, an actuating mechanism rotatably mounted on said frame, a switch arm pivotally mounted on said mechanism and carrying a blade contact at its opposite free end, a grounding contact disposed adjacent to and near the upper end of said stack in alignment with the axis of rotation of said mechanism, and means for rotating said mechanism to move said switch arm through an arcuate path for aligning said arm axially coextensive with the axis of rotation of said mechanism and rotating said arm angularly around its own axis to place said blade contact in high pressure engagement with said grounding contact.

13. The combination with a high tension current control switch wherein a movable switching element is disposed between two stationary contacts mounted on stationary insulating stacks, of a grounding switch comprising a supporting frame disposed adjacent to and near the lower end of one of said stacks, an actuating mechanism rotatably mounted on said frame, a switch arm pivotally mounted on said mechanism and carrying a blade contact at its opposite free end, a grounding contact disposed adjacent to and near the upper end of said stack in alignment with the axis of rotation of said mechanism, means for rotating said mechanism to move said switch arm through an arcuate path for aligning said arm axially coextensive with the axis of rotation of said mechanism and rotating said arm angularly around its own axis to place said blade contact in high pressure engagement with said grounding contact, means in said mechanism for locking the same against displacement to secure said blade contact in said high pressure engagement with said grounding contact, and means effective for breaking said locking condition upon rotating said mechanism to remove said blade contact from engagement with said grounding contact.

14. In a high tension switch, a support carrying a stationary contact, a round conductor bent upon itself with its ends forming supporting legs disposed parallel to each other and its central portion forming a circular loop extending at an angle to said legs, a support, a circular cap for attachment to said support, and channels in said cap for receiving the ends of said legs in their entirety and for securing said legs on said support, said loop constituting a stationary arcing horn.

15. In a high tension switch, a support carrying a stationary contact, a round conductor bent upon itself with its ends forming supporting legs disposed parallel to each other and its central portion forming a circular loop disposed at an angle to said legs, a support, a circular cap for attachment to said support, channels in said cap for receiving the ends of said legs in their entirety to secure said legs on said support, said loop constituting a stationary arcing horn, stationary contact means on said support, a movable conductor for engagement with said contact means, and a round conductor bent upon itself with its ends disposed in parallel to each other and secured in their entirety within said movable conductor, the central portion of said last named round conductor forming a loop and constituting a companion movable arcing horn.

16. In a current control device, the combination of a rotatable control member with a switch blade, comprising a journal member attached to one end of said switch blade, and pivot means carried by said control member and being rotatable therewith for pivotally supporting said journal member to move said switch blade through an arcuate path and to simultaneously rotate it with respect to said control member responsive to rotation thereof.

17. The combination and structure defined in claim 16, together with a support for journalling said control member and said pivot means, a guide member journalled on said support, and means in said guide member for movably supporting said switch blade to govern the arcuate motion thereof.

18. The combination and structure defined in claim 16, together with a support for journalling said control member and said pivot means, contact means carried by said support, and cam means carried by said journal member to establish high pressure engagement with said contact means in the electrically operative position of said switch blade.

19. The combination and structure defined in claim 16, together with a support for journalling said control member and said pivot means, and cooperating limit stop means on said support and on said pivot means for governing the extent of movement of said switch blade responsive to the rotation of said control member.

20. The combination and structure defined in claim 16, wherein said switch blade is automatically locked in the operating position thereof, together with means for releasing said locked condition upon rotating said control member to move said switch blade out of said operating position.

21. The combination and structure defined in claim 16, wherein said switch blade is automatically locked in the operating position thereof, together with means for releasing said locked condition upon rotating said control member to move said switch blade out of said operating position, and limit stop means effective to define the limit of movement of said switch blade when the same is moved out of its locked operating position.

22. In combination with a high tension circuit breaker having two spaced insulating stacks carrying circuit contacts and a switch blade for establishing current carrying relation between said contacts, a grounding device comprising a ground contact connected with one of said circuit contacts and extending from the stack corresponding thereto, a grounding blade for engagement with said grounding contact, and means for supporting and operating said grounding blade in a plane which is adjacent to and substantially parallel with the axial plane of said insulating stacks.

23. A device for actuating the switch blade of a high contact pressure switch, comprising a rotatable actuating member and a journal therefor, a pivot pin extending from said member at an angle to the axis of rotation thereof, an operating member attached to one end of said blade and rotatably journalled on said pin, a guide for said operating member, and means extending from the journal for said actuating member for pivotally mounting said guide.

24. The device defined in claim 23, together with bearing means in said guide for journalling said operating member.

25. The device defined in claim 23, together with stop means on said journal for said actuating member for limiting the motion of said guide in the disconnect operation of said switch.

26. The device defined in claim 23, together with contact means adjacent the journal for said actuating member, and cam means on said operating member for effecting high contact pressure contact therewith in the operating position of said blade.

THORSTEN FJELLSTEDT.